United States Patent
Kitahara et al.

(10) Patent No.: US 6,847,377 B2
(45) Date of Patent: Jan. 25, 2005

(54) SYSTEM, METHOD AND COMPUTER PROGRAM CONVERTING PIXELS TO LUMINANCE LEVELS AND ASSIGNING COLORS ASSOCIATED WITH LUMINANCE LEVELS IN PRINTER OR DISPLAY OUTPUT DEVICES

(75) Inventors: Katsuhito Kitahara, Kagoshima (JP); Kazuyuki Yokoyama, Matsumoto (JP); Yukiharu Horiuchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 10/026,157

(22) Filed: Dec. 18, 2001

(65) Prior Publication Data

US 2002/0089514 A1 Jul. 11, 2002

Related U.S. Application Data

(60) Provisional application No. 60/317,918, filed on Sep. 7, 2001, and provisional application No. 60/317,782, filed on Sep. 7, 2001.

(30) Foreign Application Priority Data

| Jan. 5, 2001 | (JP) | .................................... 2001-000671 |
| Feb. 6, 2001 | (JP) | .................................... 2001-029749 |

(51) Int. Cl.[7] ............................. G09G 5/02; G06K 9/00
(52) U.S. Cl. ..................... 345/600; 358/2.99; 358/520; 382/162; 382/167
(58) Field of Search .......................... 345/600; 358/1.9, 358/2.99, 3.01, 520, 527, 534; 382/162, 167, 266; 348/631; 347/15, 43

(56) References Cited

U.S. PATENT DOCUMENTS

| 4,488,245 A | * | 12/1984 | Dalke et al. ................. 382/167 |
| 4,837,613 A | | 6/1989 | Paxton et al. |
| 4,873,570 A | | 10/1989 | Suzuki et al. |
| 5,045,967 A | | 9/1991 | Igarashi |
| 5,111,302 A | * | 5/1992 | Chan et al. ................. 358/534 |
| 5,146,346 A | | 9/1992 | Knoll |
| 5,278,641 A | * | 1/1994 | Sekizawa et al. ........... 358/527 |
| 5,467,196 A | | 11/1995 | Fukushima et al. |
| 5,581,375 A | | 12/1996 | Ma |
| 5,680,230 A | | 10/1997 | Kaburagi et al. |
| 5,740,333 A | | 4/1998 | Yoh et al. |
| 5,966,461 A | * | 10/1999 | Harrington .................. 382/167 |
| 6,188,493 B1 | | 2/2001 | Esaki et al. |
| 6,198,469 B1 | * | 3/2001 | Tjandrasuwita ............. 345/690 |
| 6,206,504 B1 | | 3/2001 | Payne |
| 6,502,923 B2 | | 1/2003 | Payne |
| 6,628,842 B1 | * | 9/2003 | Nagao ........................ 382/266 |

FOREIGN PATENT DOCUMENTS

| EP | 0 596 706 | 5/1994 |
| JP | 61-208578 | 9/1986 |
| JP | 61-250722 | 11/1986 |

(List continued on next page.)

OTHER PUBLICATIONS

1998 Adobe Systems, Inc., Adobe Photoshop 5.0 User Guide for Macintosh and Windows, pp. 63–133.

(List continued on next page.)

*Primary Examiner*—Matthew C. Bella
*Assistant Examiner*—Anthony J Blackman

(57) ABSTRACT

Print data suitable for printing or displaying an image are generated by assigning print colors after color reduction using a process that removes color reduction noise and produces clear contours in the print image. A source data capturing unit obtains source data containing image data and/or text data in plural colors. A data conversion unit converts color data for each pixel in the source data to luminance data for each pixel. A color assignment unit assigns a printable color to each pixel according to the luminance level of the converted luminance data. Source data is thus converted to luminance data, and usable colors are then assigned according to the brightness values of the image represented by the converted luminance levels.

39 Claims, 20 Drawing Sheets

FOREIGN PATENT DOCUMENTS

| | | |
|---|---|---|
| JP | 62-88071 | 4/1987 |
| JP | 63-060672 | 3/1988 |
| JP | 63-172662 | 7/1988 |
| JP | 1-206052 | 8/1989 |
| JP | 2-84364 | 3/1990 |
| JP | 2-293921 | 12/1990 |
| JP | 4-190466 | 7/1992 |
| JP | 4-264915 | 9/1992 |
| JP | 6-24046 | 2/1994 |
| JP | 6-227078 | 8/1994 |
| JP | 6-88427 | 11/1994 |
| JP | 7-66974 | 3/1995 |
| JP | 7-66975 | 3/1995 |
| JP | 7-175613 | 7/1995 |
| JP | 8-84268 | 3/1996 |
| JP | 08-090767 | 4/1996 |
| JP | 8-169142 | 7/1996 |
| JP | 8-230269 | 9/1996 |
| JP | 8-282016 | 10/1996 |
| JP | 9-66643 | 3/1997 |
| JP | 9-135325 | 5/1997 |
| JP | 9-200554 | 7/1997 |
| JP | 10-051770 | 2/1998 |
| JP | 10-086461 | 4/1998 |
| JP | 10-148574 | 6/1998 |
| JP | 11-69173 | 3/1999 |
| JP | 11-070780 | 3/1999 |

OTHER PUBLICATIONS

Ithaca—Press Release, "Transact Technology's Color Inkjet Printer Provides New Marketing Opportunities", Apr. 17, 2000, 1 page.

Ithaca—Press Release, "Transact Unveils Color Inkjet Printer; Turns The World of POS Upside Down", Apr. 17, 2000, 1 page.

Ithaca—Press Release, "Transact's New POSjet Chosen For Peripheral Systems Techtour At Retail Systems 2000", Apr. 17, 2000, 1 page.

Ithaca—Press Release, "Transact's New Color InkJet POS Printer Meets Hospitality Industr Needs And Is Also A Brand Builder", Apr. 20, 2000, 1 page.

Ithaca—"How To Use The PJ1000 Image Converter", before Apr. 17, 2000, 12 pages.

"Post Office Site", http://www.joshuatreevillage.com/228/po.htm.

"Tech 316 and 550 Weekly Assignments", http://www.technology.ewu.edu./Tech316/ComGA1.htm.

* cited by examiner

|  | R | G | B | 256 LEVELS | 8 LEVELS |
|---|---|---|---|---|---|
| W (WHITE) | 255 | 255 | 255 | 255 | 7 |
| Y (YELLOW) | 255 | 255 | 0 | 225 | 7 |
| C (CYAN) | 0 | 255 | 255 | 178 | 5 |
| G (GREEN) | 0 | 255 | 0 | 149 | 4 |
| M (MAGENTA) | 255 | 0 | 255 | 105 | 3 |
| R (RED) | 255 | 0 | 0 | 76 | 2 |
| B (BLUE) | 0 | 0 | 255 | 29 | 0 |
| K (BLACK) | 0 | 0 | 0 | 0 | 0 |

SYSTEM, METHOD AND COMPUTER PROGRAM CONVERTING PIXELS TO LUMINANCE LEVELS AND ASSIGNING COLORS ASSOCIATED WITH LUMINANCE LEVELS IN PRINTER OR DISPLAY OUTPUT DEVICES

CONTINUING APPLICATION DATA

This application claims the benefit of U.S. Provisional Application Nos. 60/317,918, filed Sep. 7, 2001, and 60/317,782, filed Sep. 7, 2001.

BACKGROUND OF THE INVENTION

1. Field of the Invention

The present invention relates generally to a system for, and method of, processing image data for an output device such as a printer or display, wherein colors in a source image are assigned to a limited number of colors available in the printer or display (i.e., printable colors) in order to print or display full-color or other multicolor image data using fewer colors than are in the source image. The system and method of this invention are particularly compatible with a color printer capable of printing only a limited number of colors. This type of printer is referred to herein as a "limited-color printer."

2. Description of the Related Art

By using 256 levels each for red, green, and blue, modern graphics applications can express more than 16 million colors in a full-color image. Full-color printers capable of printing these images are now commonly available. While printers used in business have primarily been monochrome (black & white) printers because of their greater speed and economy, color printers are now also beginning to be used in business settings.

While full-color printers make it possible to use a palette of diverse colors for greater expressiveness and variety, the drawback is that the more colors that are printed, the longer it takes and the higher the operating costs. This is a particular problem with printers used in business settings where high-speed printing is essential. Balancing the desire for the expressiveness that is possible with color printing with the need for fast printing and economical operation is particularly important with printers used for specialized applications such as POS terminals. In such applications, there is a 1:1 relationship between a customer and the printing operation, printer output is handed directly to the customer on the spot, and high speed printing is therefore essential. Two-color printers, that is, printers limited to printing two colors, are therefore beginning to be used for such specialized printing applications. Applications for this type of printer currently include POS printers such as used in the retail industry, ATM printers used in banks, printers for printing tickets for parking lots and customer service numbers, and printers used in kiosk terminals in convenience stores, for example. The primary object of such printers is to print text. Text data is typically printed in black, and the two-color printers used in such applications are typically capable of printing black and one other color (normally red, green, or blue). The printer could, however, print two colors neither of which is black, or the printer could be a three-color printer capable of printing two colors in addition to black.

In order to print a full-color image on this type of limited-color printer, the data representing the full-color image must be reduced, through a process known as color reduction, to the colors that can be printed by the printer. In addition to enabling printing full-color images on a limited color printer, color reduction of the image data is also used to, for example, print an image using just the available remaining colors when a particular color of ink runs out. The data that represent the source image to which such color reduction is applied and to which color colors are assigned (color assignment) is referred to herein as "source data."

Methods for reducing the colors in a full-color or other multicolor image include simple color reduction, dithering, and error diffusion. Dithering and error diffusion, however, introduce a fine noise pattern as a result of the color reduction process. When an image with such noise spots is then printed with only a few colors, the spots become obvious and conspicuous. It is particularly important for logos printed on a receipt by a POS printer to be clearly defined so that the printed image is easily recognizable. The contours and shape of the logo must therefore be clearly expressed even when printed with a small palette of colors. Some logos are designed with a complicated blend of colors and color brightness (appearing as a difference in luminance (brightness) during image data processing).

Simple color reduction techniques simply digitize RGB color depth referenced to a defined median value, thus emphasizing the color difference and not clearly reflecting the difference in brightness. The result is that when logos with complicated coloring and subtle brightness (luminance) differences are reduced with simple color reduction, the loss of luminance difference information results in the printed logo differing greatly from the original logo.

Furthermore, when a logo for a particular printing purpose, such as a customer service notice, product advertisement, or coupon, is printed using only a few colors, it is desirable to be able to select among a variety of image processes in order to create the best possible print image.

OBJECTS OF THE INVENTION

The present invention is directed to a solution for the above problems, and an object of this invention is to provide a system for, and method of, reducing a source image containing multiple colors to a fewer number of printable colors that are then used to print the image.

A further object of this invention is to provide such system and method which enables a source image to be printed accurately and clearly with a limited number of colors when specific shapes are defined in the source image by luminance difference information.

Yet a further object of the invention is to provide such system and method for reducing a source image based on luminance information.

SUMMARY OF THE INVENTION

In accordance with aspects of the present invention, the color data of an entire source image is converted to luminance data by converting the color values of each pixel in the source data, where the source data is, for example, a multicolor image, to luminance data for that pixel. Print data is then generated based on the luminance levels of the converted source data image by assigning a color that can be printed by the printer to each pixel according to the luminance level indicated by the luminance data of that pixel. When the source image is printed using a limited number of colors according to the invention, it can create print data from which a print image can be produced that is obviously like, and clearly represents, the source image. It is also possible to provide a system and method that can apply various image processes based on luminance information in addition to dithering and other color reduction methods in order to print a source image using few colors.

According to one aspect of the present invention, a system for processing image data for display or printout by an output device is provided. The system comprises a source data capturing unit for obtaining source data containing a representation in plural colors of an image, a graphic or text; a data converter for converting color data for each pixel in the source data to luminance data for that pixel, the luminance data representing one of a plurality of luminance levels; and a color assignment unit for assigning one of a plurality of colors that are available in the output device to each pixel according to the luminance level represented by the luminance data of that pixel. When the output device is a printer, printable colors can thus be assigned according to image brightness, thereby preventing the fine spots that occur with color reduction and creating an image that is clearly defined when printed with few colors.

Preferably, the data converter is adapted to convert the color data to the luminance data by weighting each primary color intensity value by a weighting factor assigned to that color intensity value, and summing the weighted color intensity values. This compensates for any offset between color depth and luminance, and makes it possible to calculate an accurate luminance value for each pixel.

Preferably, the primary colors are red, green, and blue, and the ratio of the weighting factors is equal, or approximately equal, to RGB=3:6:1. This method corrects the luminance values according the relative luminance characteristics of the component colors (RGB).

Preferably, the data converter comprises a luminance calculator for converting the color data for each pixel to first luminance data representing one of a first number of luminance levels, and a gray level processor for further converting the first luminance data for each pixel to second luminance data representing one of the plurality of luminance levels, the plurality being a second number smaller than the first number. This method further reduces, for example, 256 luminance levels to 8 levels, thereby simplifying color assignment.

Preferably, the gray level processor comprises a distribution calculator for calculating a luminance distribution by counting for each luminance level of the first number the number of pixels whose corresponding luminance data represents that luminance level, and for detecting one or more luminance levels that represent local pixel count minimums in the luminance distribution; and threshold value selecting means for setting threshold values based on the one or more minimums. The gray level processor is adapted to reduce the first number of luminance levels to the second number based on the threshold values. A print image accurately reflecting the brightness of the source image can thus be created by using the luminance levels near these transition points as the threshold values for reducing the number of luminance levels.

Preferably, the distribution calculator is adapted to smooth the luminance distribution, and to detect the one or more minimums from the smoothed distribution curve. This smoothing process removes small fluctuations in the luminance distribution, reflects large changes in the luminance in the distribution curve, and is thus able to detect more appropriate threshold values.

Preferably, the distribution calculator is adapted to detect the one or more minimums by scanning the luminance distribution from one of the smallest and the highest luminance level to the other one of these two luminance levels and finding one or more luminance levels at which the pixel count value starts increasing and keeps increasing for a predetermined plurality of consecutive luminance levels, after it had decreased for a predetermined plurality of consecutive luminance levels. This technique prevents using minimums forming small valleys as threshold values, and thus more accurately reflects luminance differences in the print image.

Preferably, the plurality of luminance levels is eight. Converting the image to approximately eight levels makes it possible to accurately express large changes in image luminance, and makes it easier to assign colors using a further 2-value or 3-value conversion.

Preferably, the plurality of luminance levels is, and the color assignment unit is adapted to assign to each of the N luminance levels a respective one of N available colors.

Preferably, the color assignment unit comprises color assignment selection means responsive to user input for specifying or changing the assignment of an available color to each pixel based on the luminance level represented by the luminance data of that pixel. In this case the user can freely assign printable colors to the pixels. The user may want to change the color assignment as a result of deciding the final color assignment based on the visual result of the color assignment setting. This aspect of the invention is particularly useful when it is desirable to enable the user to determine specific color assignments.

Preferably, the output device is a printer for printing on a printing medium, and the plurality of available colors are N printable colors defined by material colors including colors of ink or heat sensitive colorants, and the color of the printing medium itself. The printable colors including the non-printing color of the printing medium (typically white and paper) includes colors that can be expressed with dithering (which expresses different tones using multiple dots in a unit area), and includes tones that can be printed with over-striking and other such printing techniques. It will be noted that by increasing the number of luminance levels resulting from the low resolution conversion step as the number printable colors increases, greater detail can be achieved in the print image.

The color assignment unit enables assigning to each pixel based on the luminance level of each pixel any of a plurality of printable colors that can be expressed by dithering. This enables a richer variety of color expression. When numerous colors (tones) can be printed by dithering, the image must also be converted to a number of luminance levels equal to the number of printable tones.

The present invention is particularly advantageous when used as an image data processing system for generating logo data to be stored in a POS printer and printed therefrom.

In another aspect, the invention involves a method of processing image data for display or printout by an output device. The method comprises the steps of: (a) obtaining and storing source data containing a representation in plural colors of an image, a graphic or text; (b) converting color data of each pixel in the source data to luminance data for that pixel, the luminance data representing one of a plurality of luminance levels; and (c) assigning one of plurality of colors that are available in the output device to each pixel according to the luminance level represented by the luminance data of that pixel.

Preferably, the color data of each pixel is represented by intensity values of primary colors, and step (b) comprises converting the color data to the luminance data by weighting each color intensity value by a weighting factor assigned to that color intensity value, and summing the weighted color intensity values.

Preferably, the primary colors are red, green, and blue, and the ratio of the weighting factors is equal or approximately equal to R:G:B=3:6:1 where R represents red, G represents green and B represents blue.

Step (b) preferably comprises: (b)(1) converting the color data for each pixel to first luminance data representing one of a first number of luminance levels, and (b)(2) further converting the first luminance data for each pixel to second luminance data representing one of the plurality of luminance levels, the plurality being a second number smaller than the first number.

Step (b)(2) preferably further comprises: (b)(2)(i) calculating a luminance distribution by counting for each luminance level of the first number the number of pixels whose corresponding luminance data represents that luminance level; (b)(2)(ii) detecting one or more luminance levels that represent local pixel count minimums in the luminance distribution; (b)(2)(iii) setting threshold values based on the one or more minimums; and (b)(2)(iv) reducing the first number of luminance levels to the second number based on the threshold values.

Step (b)(2)(ii) preferably detects the one or more minimums by scanning the luminance distribution from one of the smallest and the highest luminance level to the other one of these two luminance levels and finding one or more luminance levels at which the pixel count value starts increasing and keeps increasing for a predetermined plurality of consecutive luminance levels, after it had decreased for a predetermined plurality of consecutive luminance levels.

Step (b)(2) preferably further comprises: (b)(2)(v) smoothing the luminance distribution, and step (b)(2)(ii) comprises detecting the one or more minimums from the smoothed luminance distribution.

The plurality of luminance levels is preferably eight.

Preferably, the plurality of luminance levels is N, and step (c) comprises assigning to each of the N luminance levels a respective one of N available colors.

Step (c) preferably comprises responding to user input by specifying or changing the assignment of an available color to each pixel based on the luminance level represented by the luminance data of the pixel.

The method is preferably applied to processing image data for printout on a printing medium by a printer, wherein the plurality of available colors are printable colors defined by material colors provided for printing in the printer, the material colors including colors of ink or heat sensitive colorants, and the color of the printing medium itself.

The printable colors include halftones that can be created by combining the material colors.

In accordance with another aspect of the invention, a machine-readable medium carrying a program of instructions executable by the machine to perform the above-described method or steps thereof. Such a machine-readable medium may be any known medium for carrying a program including an electromagnetic carrier wave. Moreover, the functions described herein may be realized with a CPU, ROM, RAM, display device, input/output device, interface, and a control program and data set stored in ROM and RAM.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a table showing the relationship between color depth and luminance for white (W), yellow (Y), cyan (C), green (G), magenta (M), red (R), blue (B), and black (K);

FIG. 14(a) is a schematic representation of an RGB gradation cube for such processes, and FIG. 14(b) to FIG. 14(e) are monochrome representations of that cube converted to a plane figure and then processed by dithering, error diffusion, simple color reduction, and the processing method of this invention, respectively;

DESCRIPTION OF THE PREFERRED EMBODIMENTS

Figure 1:
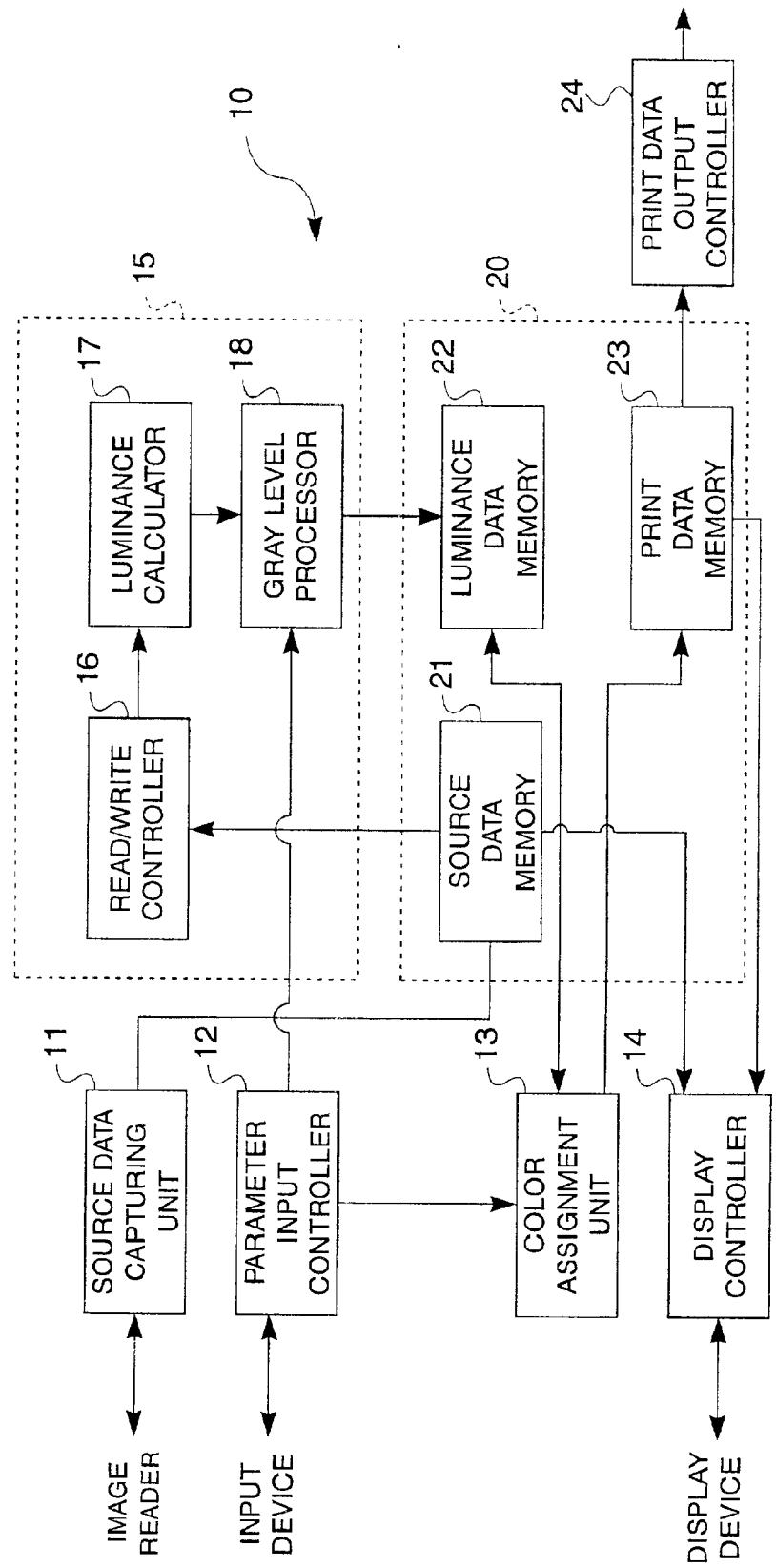
FIG. 1 is a functional block diagram of a system according to an embodiment of the present invention.

Preferred as well as alternative embodiments of the present invention are described below with reference to the accompanying figures. Additional embodiments can also be achieved by replacing one or more of the elements described below with an equivalent, as will be apparent to those skilled in the art based on the following description. All such variations and alternative embodiments within the scope of the appended claims are included in this invention.

Main Applications and Need for the Invention: Growing Use of Printing Color Images with Limited Colors The present invention is particularly useful for processing image data to be printed on a limited-color printer used in specialized business applications. The term image data as used herein includes text data that may be printed or displayed. The invention is described below with reference to a printer used in a POS system (referred to below as a POS printer) as an example of this type of limited-color printer for such specialized business applications. POS systems register the products purchased by a customer as sales data on a POS server, and print the sales data, such as the name and cost of the items purchased, as a paper receipt on a POS printer. The receipt is then handed directly to the customer. In addition to the sales data, the store's logo, product advertisements, announcements, and other information may also be printed on the receipt. The POS system can also use the POS printer to print coupons, free product offers, and other sales promotions. Logos, advertisements, notices, coupons, and other such information printed on the receipt also have an effect on the store's image and effectiveness of the offer. Good logo design enabling easy brand recognition is therefore desirable.

Printing normally requires that the print data be sent from a host device to the printer. This means that in order to address both the need for immediate printing (high speed printing) in direct customer transaction situations, and the need or desire for color printing, both economy and high speed communication must be considered. To reduce data communication traffic and enable faster throughput in logo printing, a particular print image is stored as logo data in the printer so that the logo data can be printed by simply sending a specific command telling the printer to print the logo from memory. Greater expressiveness of the printed image, the need for high speed printing, and economy can also be balanced by printing with a limited number of colors as described above. Color logo data is therefore stored (registered) in the printer after first processing the source data by color reduction according to the capabilities of the limited-color printer.

As will be clear from the above, logo data is typical of the print data generated by the system and method of the present invention. It will also be noted that a logo generally refers to data such as a store logo printed by a POS printer. As used herein, however, a logo refers to any data stored in a printer and printed in response to a logo print command, and specifically includes image data for product advertisements, image data for announcements and notices, image data for coupons, and image data for discount tickets.

Furthermore, while a POS printer is described as a typical example of a limited-color printer, such a printer can also be used for printing applications other than POS printing. Printers with limited-color printing capabilities can, for example, be used for bank ATM printers, customer service (queuing) number printers, and parking lot ticket printers to similarly print logos, advertisements, and announcements. Such applications have the same need for immediate printing as POS printers, and limited-color printers are therefore expected to gain a growing share of the business printer market.

This invention is effective for creating reduced-color images for printing on limited-color printers such as those described above. However, this invention is not so limited. Rather, the invention can also be used with full-color printers to, for example, intentionally reduce a full-color image to a specific number of print colors in order to emphasize a particular color or image element.

The invention, however, is expected to be particularly useful in the field of business printers such as POS printers and ATM printers. When describing a specific printing situation, the following description of the invention therefore contemplates printing using a limited-color printer such as described above, and even more particularly using a POS printer.

Overview of Printing Images with a Printer

A printer prints by receiving the print data and print commands from another device. POS printers are essentially the same in that they receive print data for each print job. Image data, however, is relatively large and therefore takes longer to transmit, and printing therefore becomes slower. POS printers therefore store (register) frequently printed image data as logo data in non-volatile memory of the printer, and print the logo data from memory when a particular logo data print command is received.

The image data to be printed in this manner must be expressed in the printable colors, that is, the colors the printer is capable of printing. Source data that is expressed by intensities of three colors, say, red, green and blue (RGB), is generally converted to print data that is expressed by intensities of cyan, magenta, yellow, black (CMYK) for printing on a full-color printer. If the printer can only print red and black (RK data), then the full-color RGB data must be reduced to RK data for printing. The source data is most commonly RGB color data and the invention is therefore described below with reference to processing of RGB color data. It will be appreciated, however, from the description herein that if the source data is CMYK color data, known CMYK-RGB conversion techniques can be used to convert the CMYK source data to RGB source data.

A typical procedure for printing a logo stored as image data inside a POS printer is as follows. When a print logo command is received by the printer, it reads the logo data specified by the received command from its memory and converts the stored logo data to bitmap image data, stores the bitmap image data in a print buffer, and prints the bitmap image data from the print buffer. Separate bitmap image data are generated for each printable color (except the non-printing color, defined later). Each dot in the bitmap for a respective color is stored as one bit. The data for the individual dots (bits) in each bitmap stored in the print buffer for each printable color are then sent in a specific sequence to the print mechanism as controlled by the print controller. The print mechanism has a print head for each printable color, and each print head prints a specific color and is controlled according to the bitmap of the corresponding printable color. The resulting printer output is a logo printed with a specific number of colors.

Since this invention primarily concerns the creation of print data to be stored as logo data in the printer and subsequently printed, further description of the printing operation itself is omitted below.

Preferred Embodiment of a Print Image Processing System

FIG. 1 is a functional block diagram of a system 10 according to a preferred embodiment of the present invention. As shown in FIG. 1, the system 10 has a source data capturing unit 11, a parameter input controller 12, a color assignment unit 13, a display controller 14, a data converter 15, a memory unit 20, and a print data output controller 24. The data converter 15 has a read/write controller 16, a luminance calculator 17, and a gray level processor 18. The memory unit 20 includes a source data memory 21, a luminance data memory 22, and a print data memory 23.

The source data capturing unit 11 is a file reading controller, scanner, or similar device for capturing as source data full-color image or other image data from which the print data is to be generated. The capturing may be scanning an image or reading an image stored on an external disk, a CD-ROM, a memory card, or other storage device or medium. The source data is then stored in the source data memory 21 as color data (RGB color data or CMYK color data). Such stored source data stored is read pixel-by-pixel by the read/write controller 16, and is transferred to the luminance calculator 17. As further described below, the luminance calculator 17 calculates (that is, converts a color value to a luminance value) a single luminance value for the plural color values defining each pixel, and stores the result. Thus, the source data (color data) in which each pixel is defined by RGB (or CMYK) color intensity values is converted to luminance data in which each pixel is defined by one of a plurality of luminance levels or gray levels. The luminance data stored for each pixel is further converted by the gray level processor 18 to luminance data on a scale with even fewer levels. The gray level processor 18 is further described below. The scale-reduced luminance data output by the gray level processor 18 is stored in the luminance data memory 22 in memory unit 20.

The luminance data so obtained and then further stored in the memory unit 20 is read by the color assignment unit 13, which then assigns a specific color to each pixel according to its luminance level. Operation of the color assignment unit 13 is also described in more detail below. The source data to which colors have been assigned by the color assignment unit 13 is then stored as print data in the print data memory 23. This stored print data is output by the print data output controller 24 as a logo data file or as print data to the printer, for example, or to another converter or processor (not shown in the figure) for conversion from RGB color data to CMYK color data, for example.

The parameter input controller 12 enables inputting data for setting the parameters and conditions (referred to below as the parameter data) of certain processing operations, including the threshold values used by the gray level processor 18 for reducing the number of luminance levels of the luminance data to a smaller number of luminance levels, and those used for the color assignments of the color assignment unit 13. Controller 12 also passes the input parameter data to the gray level processor 18 or color assignment unit 13.

The display controller 14 controls displaying the data obtained by the source data capturing unit 11 and the print data stored in the print data memory 23 after image data processing to the display unit. The image data processing parameters can be changed to create the best print data while viewing on the display unit both the source data and the print data resulting from the current parameter settings.

Converting Color Data to Luminance Data

Calculating the luminance data is described next. Luminance calculator 17 calculates the luminance of each pixel from the RGB color data. Color image data is commonly expressed as a combination of intensities of three primary colors (e.g., red, green, and blue) per pixel with the intensity of each color ranging from 0 to 255 (256 levels). In other words, the color depth of the color image data is 24 bit in this embodiment, and each pixel can therefore be logically defined as one of more than 16 million colors (256×256×256=16,777,216) in a full-color image. The relationship between these color intensities and luminance varies depending on the color ratio (R:G:B). The luminance Yc of each pixel is calculated using the following equation to convert RGB color data to luminance data.

$$Yc = 0.299R + 0.587G + 0.114B \tag{1}$$

If the source data is full-color image data, that is, if the intensity range of each color R, G and B is 0 to 255, conversion to 256 luminance levels (0 to 255) is possible using the equation $$Yc = INT((0.299R/256 + 0.587G/256 + 0.114B/256) \times 256) \tag{2}$$

where INT(x) denotes a function converting x to an integer number. Conversion to 8 levels (0 to 7) is possible using the equation $$Yc = INT((0.299R/256 + 0.587G/256 + 0.114B/256) \times 8) \tag{3}$$

FIG. 2 shows the relationship between color depth and luminance for the typical ink colors white (W), yellow (Y), cyan (C), green (G), magenta (M), red (R), blue (B), and black (K). RGB color intensities and luminance (both on a scale of 256 levels and a scale of 8 levels) are shown for each of the colors W, Y, C, G, M, R, B, K.

It should be noted that if the source data is CMYK color data, it can be directly converted to luminance data, or it can be converted to RGB data first using any known CMYK to RGB conversion technique and then converted to luminance data as explained herein. CMYK color data can be directly converted to luminance data, for instance, by substituting 255—C, 255—M, and 255—Y for R, G and B, respectively, in equations (2) or (3) above.

Reducing Luminance Data to Fewer Luminance Levels

A conversion process whereby the gray level processor 18 reduces the number of luminance levels is described next with reference to FIG. 3, which is a functional block diagram of a gray level processor 18 according to a preferred embodiment of the invention. It is assumed here that the luminance calculator 17 has converted RGB color data to 256-level luminance data. The number of luminance levels is preferably further reduced to facilitate color assignment. The gray level processor 18 therefore reduces this 256-level luminance data to fewer levels, specifically 8 levels in this example.

It will be noted that this step of further reducing the number of luminance levels is not required if, for example, the luminance calculator 17 has already reduced the source data image to 8 luminance levels by applying equation (3) above. However, if the luminance calculator 17 initially reduces the image to 8 luminance levels using simple division, it is difficult to achieve the subtle gradients that better match the luminance distribution (i.e., the number of pixels per luminance level) in the source image. However, if the image is first converted with high luminance resolution and is then reduced to a lower resolution, the final gradations will better represent the luminance distribution of the source image. If the source image is first converted to luminance data using fine gradations (such as 256 levels), for example, the luminance distribution can be determined with high resolution. The luminance data can then be reduced to fewer (low resolution) gradations based on threshold values determined from the luminance distribution. By thus converting a full-color image to a low resolution gray scale image, the actual luminance distribution of the source image can be better reflected in the color assignments of the print data.

Figure 3:
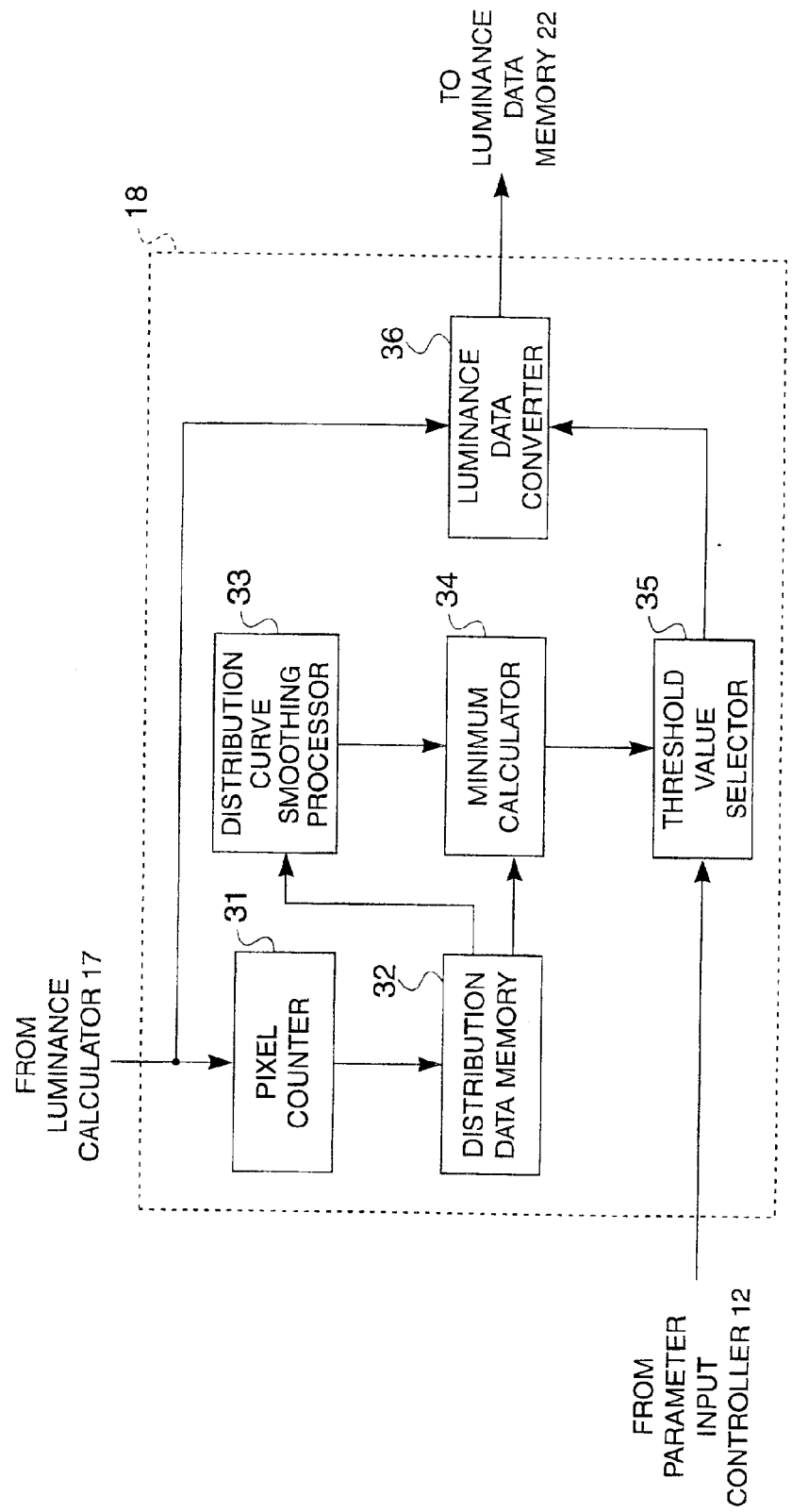
FIG. 3 is a functional block diagram of an exemplary gray level processor for use in the system of FIG. 1.

The gray level processor 18 shown in FIG. 3 sequentially counts the number of pixels in each luminance level, compares each pixel count with those at the luminance levels before and after the level of the respective pixel count to detect one or more minimums in the luminance distribution curve, and uses these minimums as the threshold values for color assignment. To achieve this, the gray level processor 18 tabulates the pixel count for each luminance level in the image, i.e., calculates the luminance distribution, and detects the minimums used as the threshold value from the distribution curve.

This process could be skipped and the threshold values determined by evenly dividing the luminance levels obtained from the luminance calculator 17, and the image then converted to a low resolution gray scale image using these threshold values. However, the threshold values obtained by such even division will not accurately reflect the change in luminance that is characteristic of the source data, and the pattern of the resulting print image may be completely different from the source image. It is therefore desirable to determine the threshold values characteristic of the image by first analyzing the luminance distribution of the source image. The gray level processor 18 is further described below.

Calculating the Luminance Distribution by Counting the Pixels in each Luminance Level As shown in FIG. 3, the gray level processor 18 has a pixel counter 31, a distribution data memory 32, a distribution curve smoothing processor 33, a minimum calculator 34, a threshold value selector 35, and a luminance data converter 36.

The pixel counter 31 reads luminance data received from luminance calculator 17, and counts the number of pixels in each luminance level. The resulting luminance distribution is then stored in the distribution data memory 32.

Distribution Smoothing Process

Figure 4:
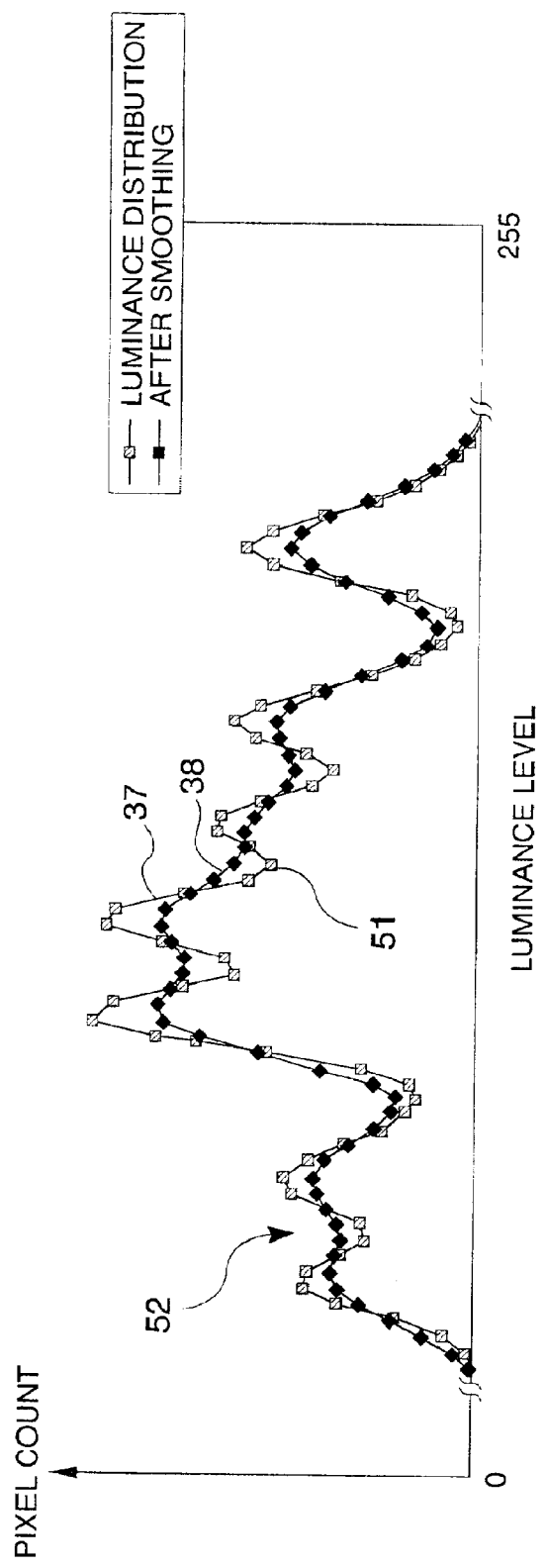
FIG. 4 is a graph showing exemplary luminance distribution curves of source data and data after a smoothing process is applied.

FIG. 4 is a graph showing the luminance distribution stored in distribution data memory 32. Note that FIG. 4 shows a section of the 0 to 255 luminance levels enlarged in order to simplify this description of the smoothing process. The luminance distribution data is shown as luminance distribution curve 37, i.e., a graph of pixel count vs. luminance level (levels 0 to 255). High resolution conversion of color to luminance data produces a luminance distribution curve 37 having some fine minimums 51 distributed along the curve. The luminance levels at these fine minimums are unsuitable for use as threshold values for reducing the number of luminance levels, and are therefore preferably removed.

These fine minimums are removed by the distribution curve smoothing processor 33, which smoothes the luminance distribution curve 37 using, for example, an averaging process. In one embodiment, for each luminance level, except the (m−1)/2 levels at each end of the distribution, the pixel count is replaced with the average of the pixel counts at m luminance levels, the original pixel count at that level and the original pixel counts at the (m−1)/2 levels before and after that level. Thus, in one embodiment where m=7, the pixel count at each luminance level, except the 3 at each end of the distribution, is replaced by the average of 7 pixel counts. Of course, the averaging process is not limited to 7 data points, but may be preformed with any suitable number of points, e.g., 5 or 9. As shown in FIG. 4, the fine minimum 51 in the pre-smoothed luminance distribution curve 37 does not appear in the smoothed distribution curve 38; it is therefore easier to find the best threshold values.

Detecting the Minimums

The minimum calculator 34 detects the minimums in the smoothed luminance distribution. Minimums can be detected by, for example, finding a point at which the pixel count decreases through k (where k=5, for example) consecutive luminance levels and then increases through the next j (where j=5, for example) consecutive luminance levels. It should be noted that applying this condition makes it possible to avoid using values, such as minimum 52, in the smoothed distribution curve that are unsuitable for determining the threshold values. It should be noted that various other suitable methods that will be apparent to one skilled in the art can also be used for minimum detection.

Determining the Threshold Values

The threshold values are then set using the luminance levels of the detected minimums. The luminance levels of the minimums can be used directly, or a specific compensation process can be applied to these luminance levels to determine the threshold values. The number of luminance levels resulting from the low resolution conversion process can be fixed or can be input using the parameter input controller 12 (FIG. 1). If the number of minimums is less than the desired number of luminance levels, the data is converted to the specified number of levels using a predetermined algorithm. For example, the luminance level dividing the greatest range between two adjacent minimums into two could be used another threshold value, and this process could be applied iteratively until the desired number of threshold levels is obtained. Operation could also be configured so that rather than applying the image analysis using the luminance distribution as described above, parameters externally input using the parameter input controller 12 could be used to determine the threshold values for low resolution conversion. The most desirable threshold values as determined by a more comprehensive analysis of the luminance data could also be set by the user while observing the distribution curve and the results of the selected threshold values.

Figure 6:
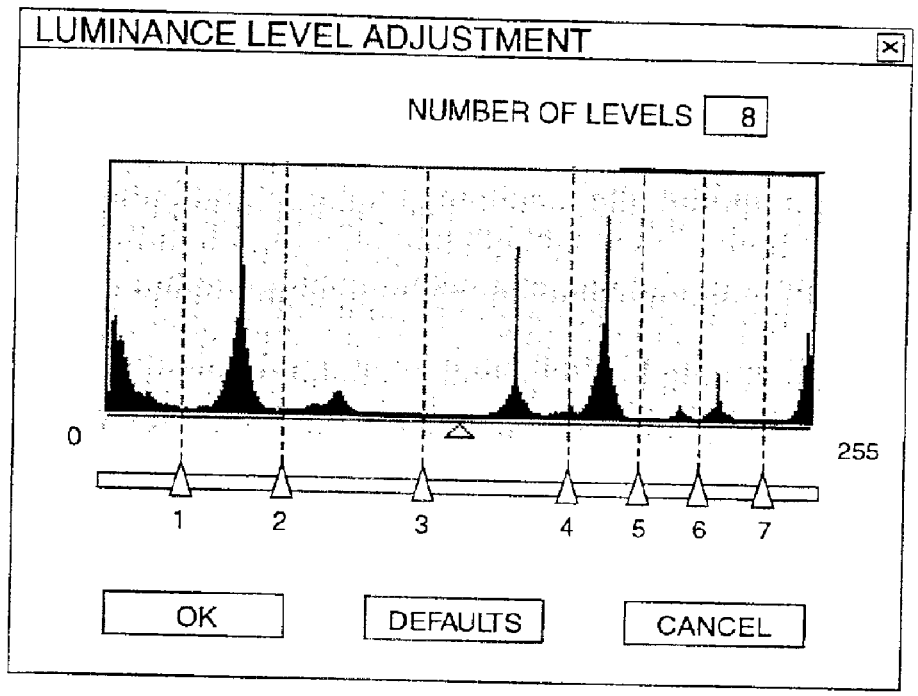
FIG. 6 is a graph showing luminance data converted to 8 levels based on threshold values 1 to 7 set by the gray level processor.

FIG. 6 is a graph showing an example of reducing the luminance data to eight levels based on seven threshold values 1 to 7 determined by the gray level processor 18. The threshold values 1 to 7 are set in the valleys (i.e., at the minimums) of the luminance distribution curve in FIG. 6. Note that if there is a sharp valley at either end of the distribution curve, e.g., the one at the left end in FIG. 6, a threshold value need not be set in such valley.

Conversion Process for Luminance Level Reduction

For each pixel, the luminance data converter 36 reads the luminance data from the luminance calculator 17, and assigns one of, for example, eight luminance levels to that pixel based on the luminance level represented by the read luminance data and the defined threshold values. This reduced-level luminance data is then stored in the luminance data memory 22 of memory unit 20.

Color Assignment Process

Figure 5:
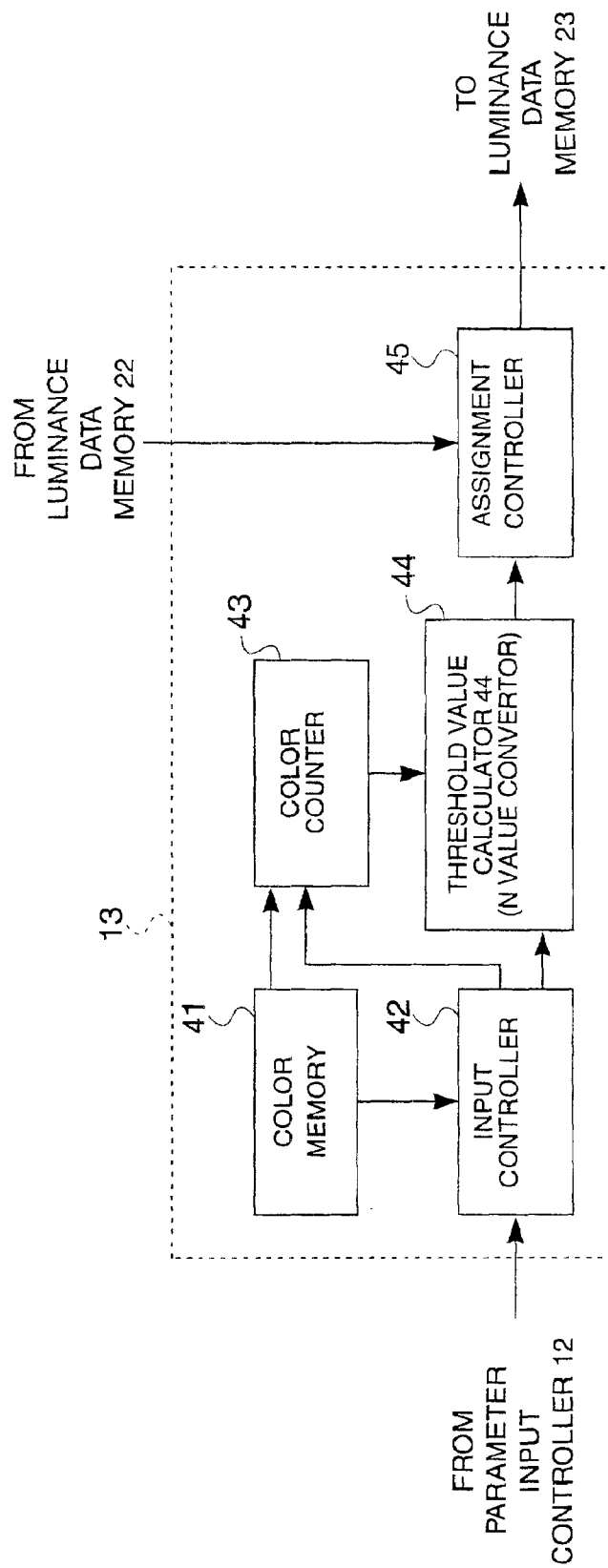
FIG. 5 is a functional block diagram of an exemplary color assignment unit for use in the system of FIG. 1.

The color assignment unit 13 (FIG. 1) next assigns a printable color to each resulting low resolution luminance data. FIG. 5 is a functional block diagram of a preferred embodiment of the color assignment unit 13. As shown in FIG. 5, the color assignment unit 13 has a color memory 41, an input controller 42, a color counter 43, a threshold value calculator 44, and an assignment controller 45.

The color memory 41 stores the printable colors, i.e., the colors that the printer can print. The printable colors are defined by material colors provided in the printer and by the material color of the printing medium (the latter being referred to herein as a "non-printing color"). For example, if the printer is an ink jet printer, the material colors would be colors of ink accommodated in ink cartridges. The material colors would be heat sensitive colorants contained in a thermal paper, if the target printer is a thermal printer for printing on the thermal paper. Also, colors of toners or ink ribbons, which may be provided in target printers, would be material colors.

The input controller 42 determines the colors to be used to print an image based on the printable colors stored in the color memory 41. Alternatively, a subset of the printable colors to be used can be input from the parameter input controller 12. The printable colors stored in color memory 41 include all color that can be expressed by the available material colors using dithering as described below. Once the printable colors are determined, the color counter 43 determines the number N of printable colors, where N is the number of expressible colors including the non-printing color. Once N is determined, the threshold value calculator 44 determines the threshold values for converting the low resolution (8 level) luminance data stored in the luminance data memory 22 to N levels.

In general, a limited-color printer is a two color printer, that is, a printer capable of printing two colors, and therefore N=3 (assuming the non-printing color is not the same as either of the printing colors). Two threshold values are determined to convert the data to three levels. Methods for reducing the number of luminance levels to three will be readily apparent to one skilled in the art. One method, for example, is to calculate a temporary base threshold value for converting the data to two levels, and then based on this temporary threshold value calculating two threshold values (first and second threshold values) for conversion to three levels. Methods for calculating threshold values for conversion to two and three levels are further described below. The threshold values can also be externally input via the parameter input controller 12.

Once the threshold values are determined, the assignment controller 45 assigns one of the printable colors to each pixel based on that pixel's luminance level and the threshold values.

Various algorithms can be used to determine how colors are assigned according to the luminance levels. One method, for example, is to assign the same color to pixels having the same luminance level, after converting the source data to N-level luminance data. The color assigned to each pixel at a particular luminance level can also be controlled by input via the parameter input controller 12. This color assignment process is the final step for determining the colors that will eventually be printed. In order to optimize the printed image it is therefore preferable to enable the user to select either one of manually specifying the threshold values for color assignment or assigning colors automatically.

Figure 7:
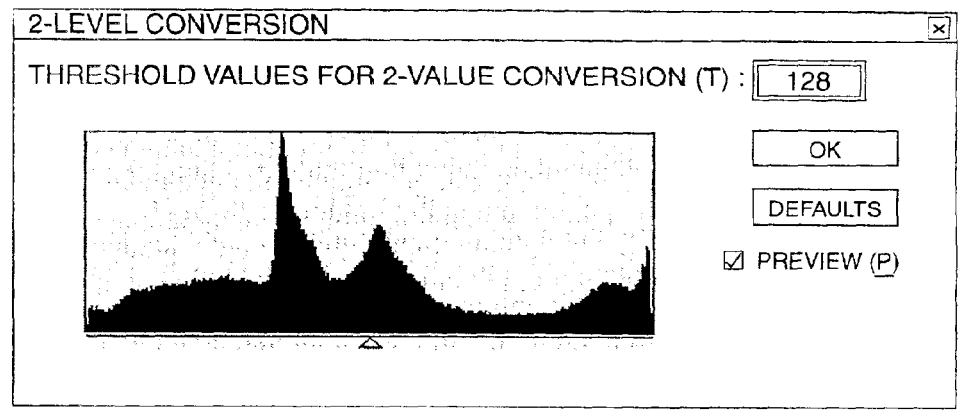
FIGS. 7(a) and 7(b) are graphs showing examples of setting threshold values for two-level and three-level conversions respectively by dividing 256 levels evenly into two or three groups respectively.
Figure 7:
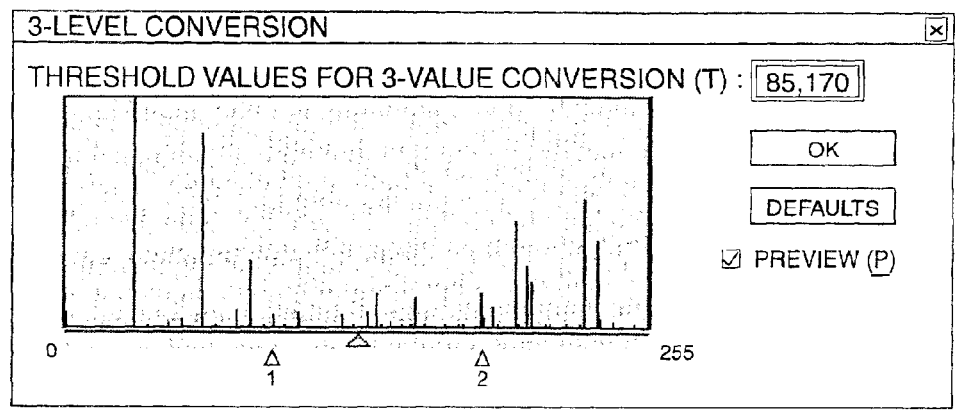

It is also possible to simply divide 256 level data from luminance calculator 17 into two or three groups for conversion to two or three levels as shown in FIG. 7(a) and (b), respectively, rather than using a process such as described above for detecting valleys (minimums) and determining threshold values from a luminance distribution. As will be understood from FIG. 7, however, simply dividing the high resolution luminance data into groups having the same number of luminance levels may not reflect the specific luminance distribution of the image, and it is therefore difficult to predict what the final printed image will actually be like. It is also possible as described above to use an intermediate luminance level reduction step to convert the high resolution data to, for example, 8 level data, thereby reflecting the luminance distribution to a lower resolution level, and then divide these eight level data into three groups in the three-level conversion process to obtain the three levels for color assignment. This method also considers the luminance distribution in the low resolution conversion step, and therefore obtains print data for a print image that better reflects the image in the source data.

Preferred Embodiment of a Print Image Processing Method

A method according to the present invention for converting source data representing a color image to print data for printing with a limited number of colors is described next with reference to FIG. 8 to FIG. 13.

Figure 8:
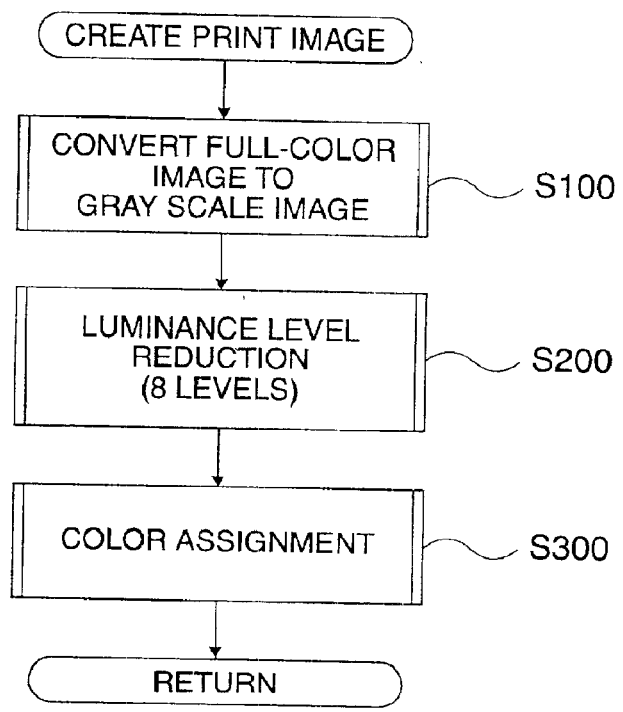
FIG. 8 is a flow chart of a according to an embodiment of the present invention.

FIG. 8 is a flow chart showing the overall process for generating print data according to a preferred embodiment of the present invention. The first part of this process is for the source data capturing unit 11 (FIG. 1) to capture as source data full-color or multicolored image data from which the print data will be generated, and to convert the captured source data to luminance data (S100). The number of luminance levels in the resulting luminance data is then reduced to, e.g., N levels which results in low resolution luminance data to facilitate the color assignment process (S200). One of the printable colors is then assigned to each pixel depending on its luminance level (S300).

Conversion to Luminance Data (S100)

Figure 9:
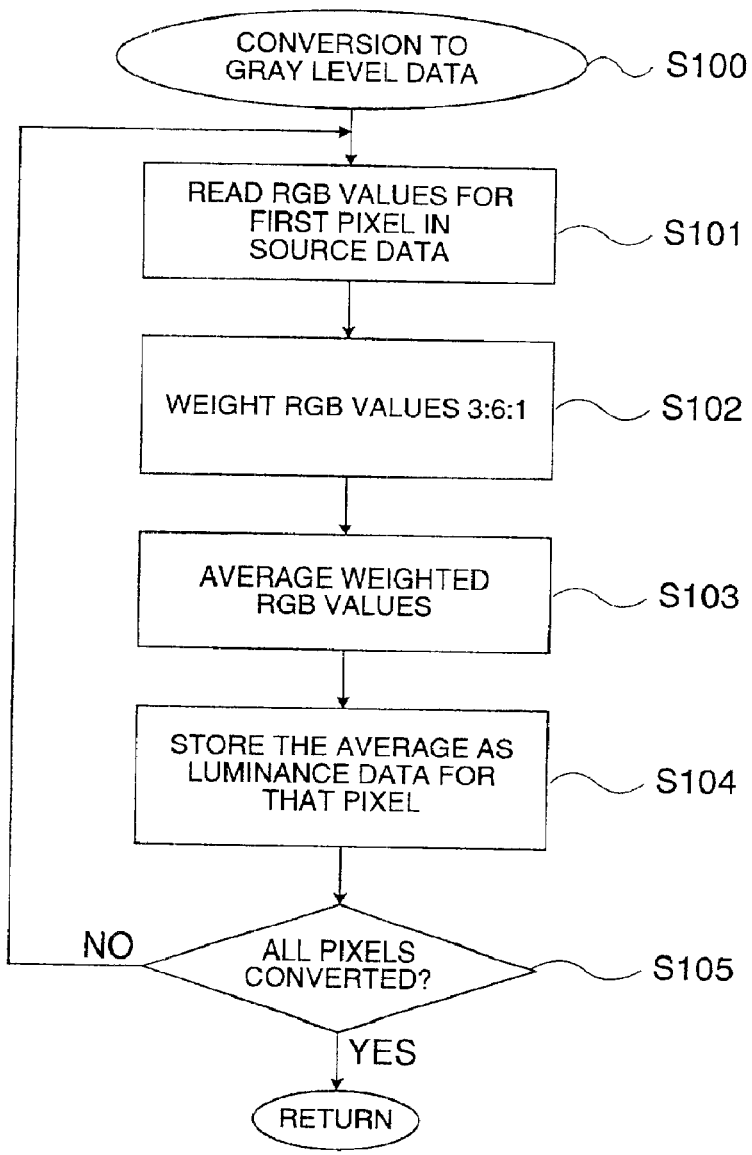
FIG. 9 is a flow chart of an exemplary process for carrying out S100 in FIG. 8.

The process for converting the color data to luminance data (S100 in FIG. 8) is described in further detail below with reference to FIG. 9, which is a flow chart of a preferred embodiment of the process in S100.

Once the source data is captured, the RGB color data for the first pixel is read from the source data (S101). This RGB color data is converted to luminance data by applying the operation of equation (2). The process shown in FIG. 9 does this by first weighting the RGB color intensity data for each pixel in accordance with equation (1) above (S102), obtaining the sum of the weighted data for each color of RGB, dividing the sum by three to obtain the average of the weighted data (S103), and then storing the resulting average as the luminance data for the pixel (S104). If the RGB color data has 24 bit color depth, e.g., each of the R, G and B intensities has one of 256 levels, this process converts the color data to 256 levels of luminance data. When the process is completed for the first pixel, the same process is applied to the second and then subsequent pixels until all pixels have been converted (S105). When steps S101 to S104 have been applied to every pixel in the image, conversion to luminance data (S100) is completed and control returns to the main procedure, which advances to step S200.

Luminance Level Reduction (S200)

Figure 10:
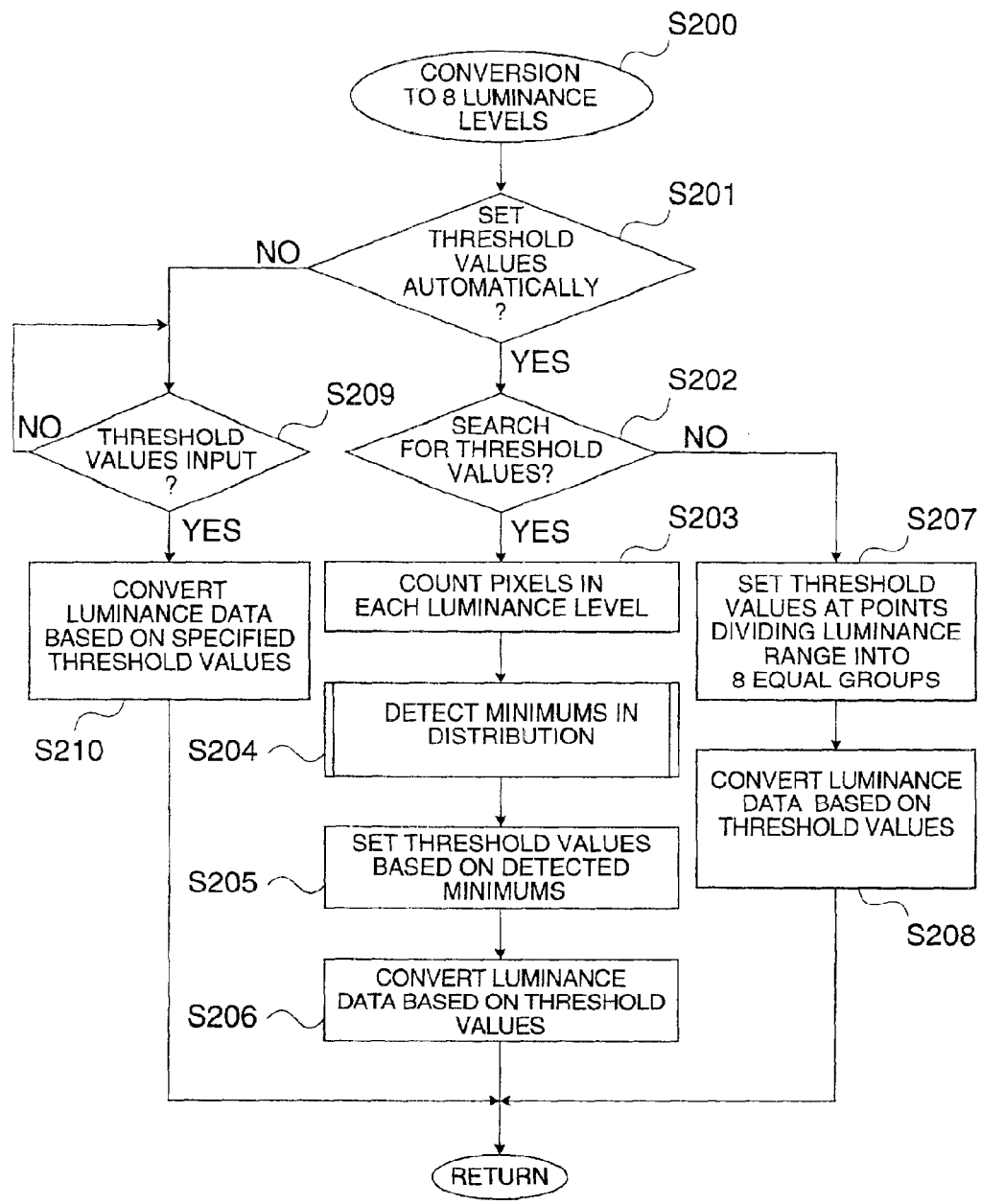
FIG. 10 is a flow chart of an exemplary process for carrying out S200 in FIG. 8.

The process for converting the luminance data to low resolution luminance data is described next with reference to FIG. 10, which is a flow chart of a preferred embodiment of the process of S200. That process will be explained by reference to a process for converting to eight luminance levels by way of example.

The first step is to determine whether automatically setting of the threshold values has been selected (S201). If not (S201 returns no), the operation waits until the threshold values are externally input (S209 returns no). When the threshold values have been externally input (S209 returns yes), the luminance data is converted to eight luminance levels based on the specified threshold values (S210).

If automatic setting of the threshold values has been selected (S201 returns yes), it is determined whether to search for the threshold values (S202). If searching for the threshold values is not selected (S202 returns no), the luminance range of 256 luminance levels that divide the 256 luminance level range into substantially eight equal groups are defined as the threshold values (S207). The pixel luminance data is then converted to eight luminance levels using these threshold values (S208).

If searching for the threshold values is selected (S202 returns yes), the number of pixels of each luminance level in the image is counted to determine the distribution of pixels among the luminance levels in the image (S203). The resulting luminance distribution is preferably smoothed as has been explained above. Minimums meeting specific conditions are then detected from the luminance distribution (S204). It should be noted that these minimums can be detected by finding luminance levels where the pixel count stops decreasing and begins increasing such as described above, or using other methods that will be apparent to one skilled in the art. Valleys without a specific size and depth, and valleys having more than a specified number of pixels in the distribution curve, can be omitted from use as a local minimum. This minimum detection step (S204) is further described in detail below.

After the minimums in the distribution have been detected, the threshold values are defined based on the luminance levels of the detected minimums (S205). As previously noted, the luminance levels of the minimums can be used directly as the threshold values, or these levels can be processed in some way to determine the threshold values. Once the threshold values are determined, the luminance data is converted to fewer luminance levels (8 in this example) based on the threshold values (S206).

Minimum Detection

Figure 11:
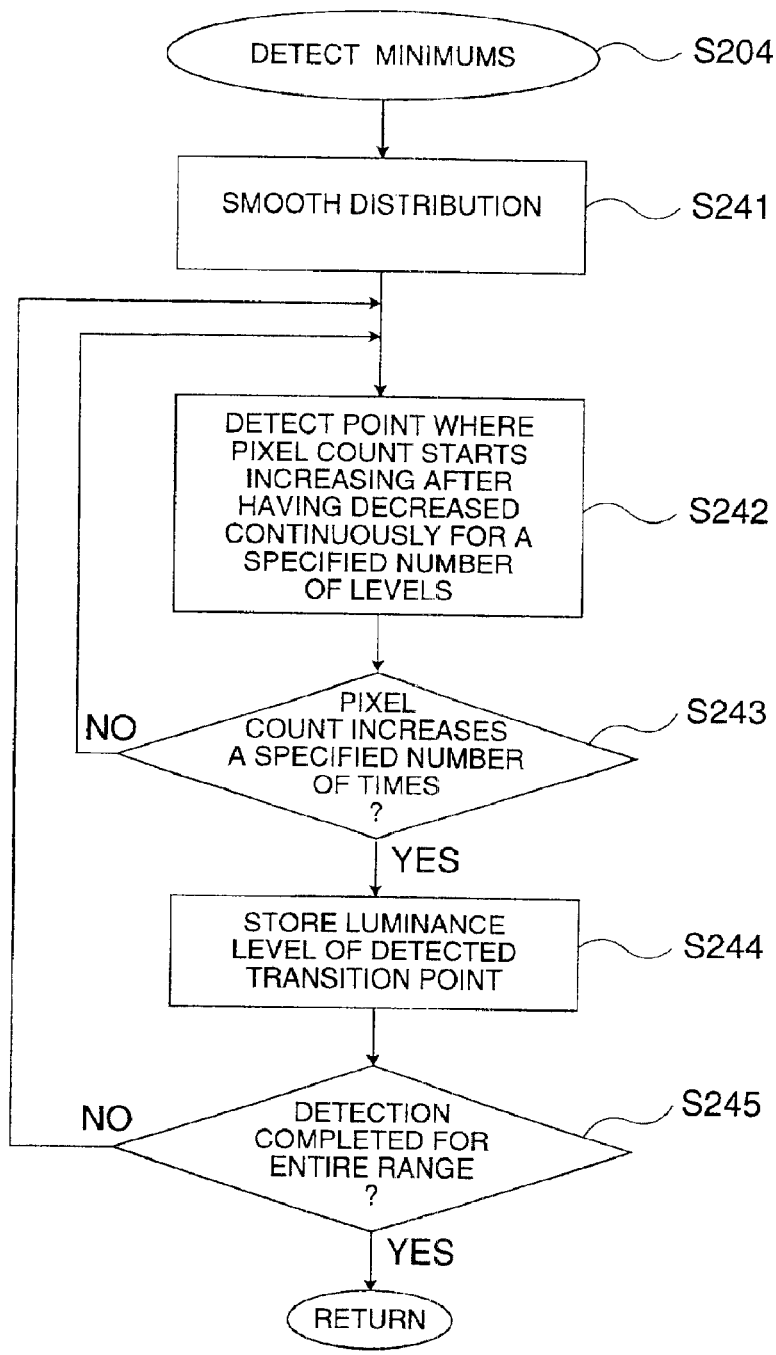
FIG. 11 is a flow chart of an exemplary process for carrying out S204 in FIG. 10.

Step (S204) for detecting the minimums of the distribution curve is described in further detail below with reference to FIG. 11, which is a flow chart of a preferred embodiment of the routine in S204.

Once the pixel count for each luminance level, and hence the luminance distribution, are obtained, the distribution curve representing the luminance distribution is smoothed (S241). The luminance distribution curve does not necessarily need to be stored or processed as an actual curve. It is only necessary to obtain the number of pixels in each luminance level, and store these pixel counts and their corresponding luminance levels. As for the details of the smoothing process performed in S241, reference is made to the previous description of FIG. 4.

The minimums of the smoothed distribution curve are then detected. The minimums can be detected by scanning the pixel counts starting from one end of the distribution curve, and detecting each transition point at which the pixel count starts increasing after having decreased continuously for some plural number of luminance levels (S242). Once such a transition point is detected, whether the pixel count increases continuously for some plural number of luminance levels after the transition point (S243) is determined. If the pixel count does not increase for the specified number of consecutive luminance levels (S243 returns no), the transition point is ignored and the next transition point is detected (S242). If the pixel count increases for the specified number of luminance levels (S243 returns yes), the transition point is determined to satisfy the detection conditions and the luminance level of that transition point is stored (S244).

It is then determined whether the minimum detection has been completed for the entire smoothed distribution curve (S245). If not (S245 returns no), the next transition point is detected (S242 to S245). If the entire distribution curve has been searched for minimums (S245 returns yes), the minimum detection process (S204) returns control to the low resolution conversion process (S200). The low resolution conversion process (S200) then steps to S205 to set the threshold values and then to S206 to reduce the luminance data to the fewer number of luminance levels as shown in FIG. 10.

Color Assignment

Figure 12:
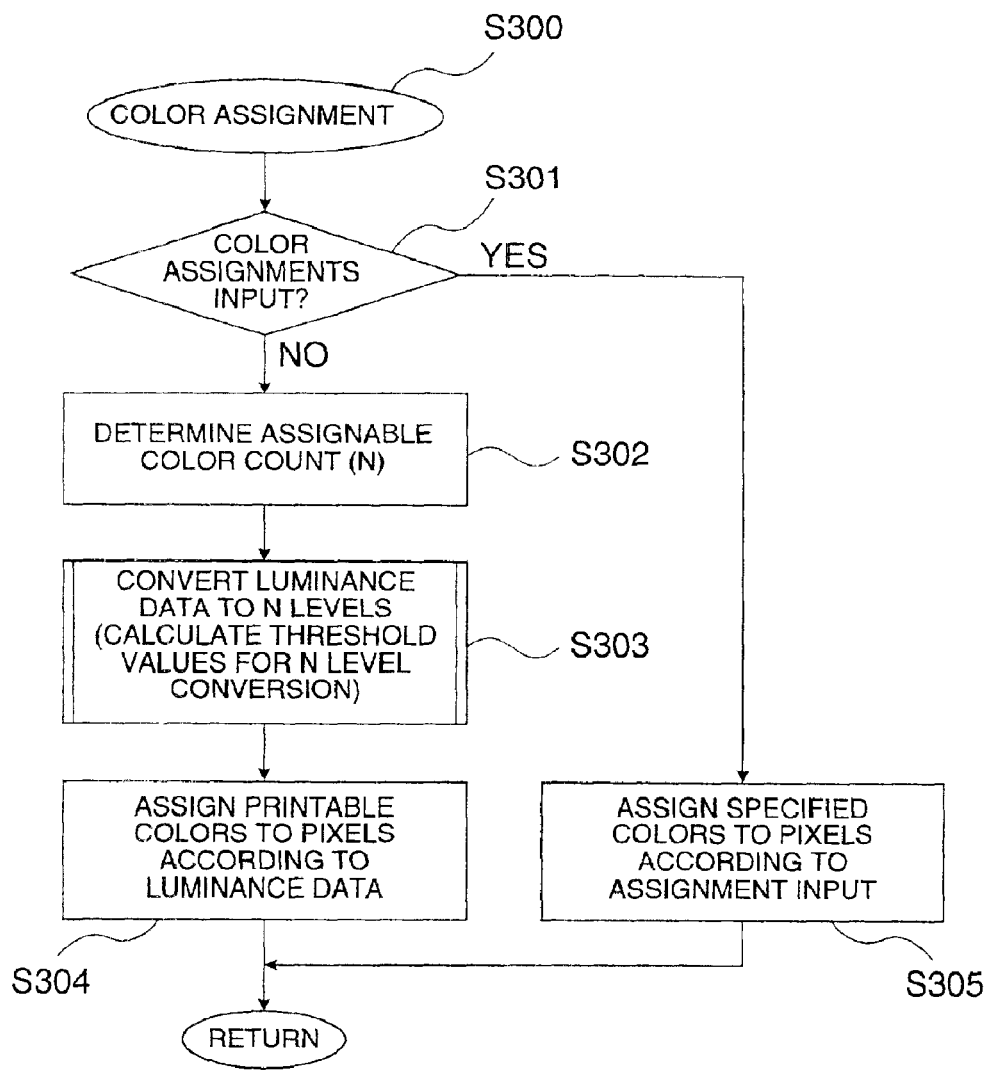
FIG. 12 is a flow chart of an exemplary process for carrying out S300 in FIG. 8.

The color assignment process is described next with reference to FIG. 12, which is a flow chart of a preferred embodiment of the color assignment process in S300 in FIG. 8.

When reduction to 8 levels, for example, is completed, the next task is to assign printable colors to the luminance levels of the resulting low resolution luminance data. The color assignment process (S300) starts by determining whether there has been any external input determining the color assignments (S301). If the color assignment parameters have been externally defined (S301 returns yes), a specific color is assigned to all pixels having a particular luminance level based on the pixel luminance data determined by the preceding steps (S305). If the color assignment parameters are not specified (S301 returns no), the number N of printable colors (including the non-printing color as described above) is determined. N is normally the maximum number of colors that can be achieved by the printer, but can be set to a value less than this maximum by user input.

Once the assignable color count N is determined, the luminance data is further converted to N levels (S303). To do this, N−1 threshold values are determined, and the luminance data is converted to N levels by applying these threshold values. An example of this N-level conversion process is further described below using a 3-value conversion process. After the luminance data is converted to N levels, colors are assigned to the resulting luminance levels (S304). Once color assignment is completed, control returns to the main process (FIG. 8).

Figure 13:
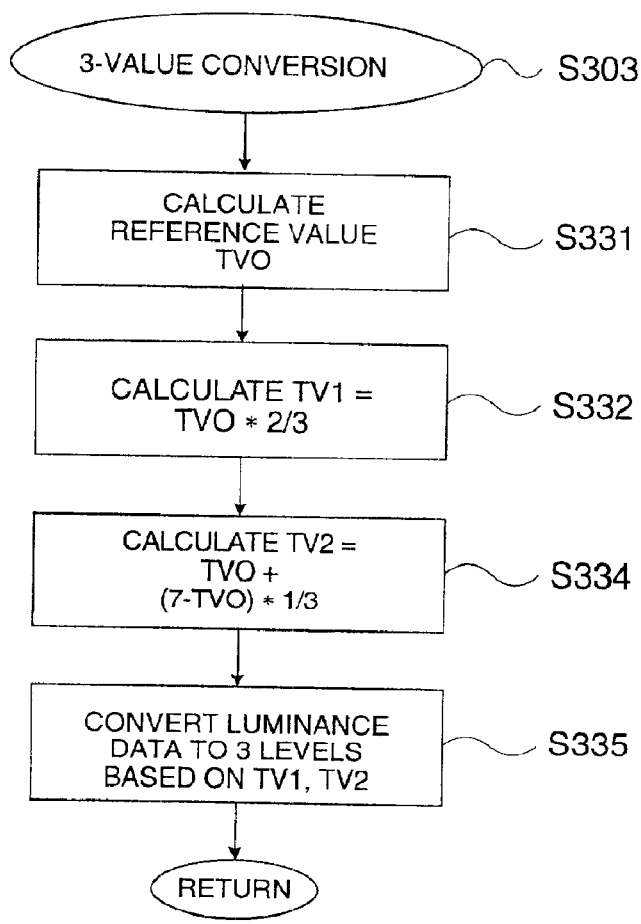
FIG. 13 is a flow chart of an exemplary process for carrying out S303 in FIG. 12.

The N-level conversion process (S300 in FIG. 8) is described in further detail below using FIG. 13, which is a flow chart of the process in S303 in FIG. 12 assuming three printable colors. Conversion to three levels requires two threshold values. To convert the luminance data to three levels, this embodiment of the invention first determines a temporary reference threshold value $TV0$ for converting the luminance data to two levels (S331). Various methods known to one with ordinary skill in the related art can be used for conversion to two values, and here we use a method known as discriminatory analysis, or "Ohtsu's method," to determine the temporary reference threshold value for two-level conversion (S332). Once this reference threshold value is determined, a first threshold value is calculated based on the reference threshold value. Various known algorithms and methods can be used here, too, and this embodiment uses $TV1 = \frac{2}{3} TV0$ as the first threshold value $TV1$ (S332). The second threshold value $TV2$ is also obtained by applying a specific equation, namely $TV2 = TV0 + (7-TV0)/3$ in this example, to the temporary reference value (S334). Using $TV1$ and $TV2$, the luminance data is then converted to three levels (S335).

This embodiment has been described with reference to a case in which threshold values for converting high resolution luminance data to low resolution (8 level) data are determined by detecting the minimums of a luminance distribution curve. These threshold values can, however, be determined using various other methods. For example, the local maximums of the luminance distribution curve could be detected and the luminance level of the median between adjacent local maximums used for the threshold values.

Specific Example of Image Data Processing

Color Conversion Using an RGB Gradation Cube

Figure 14:
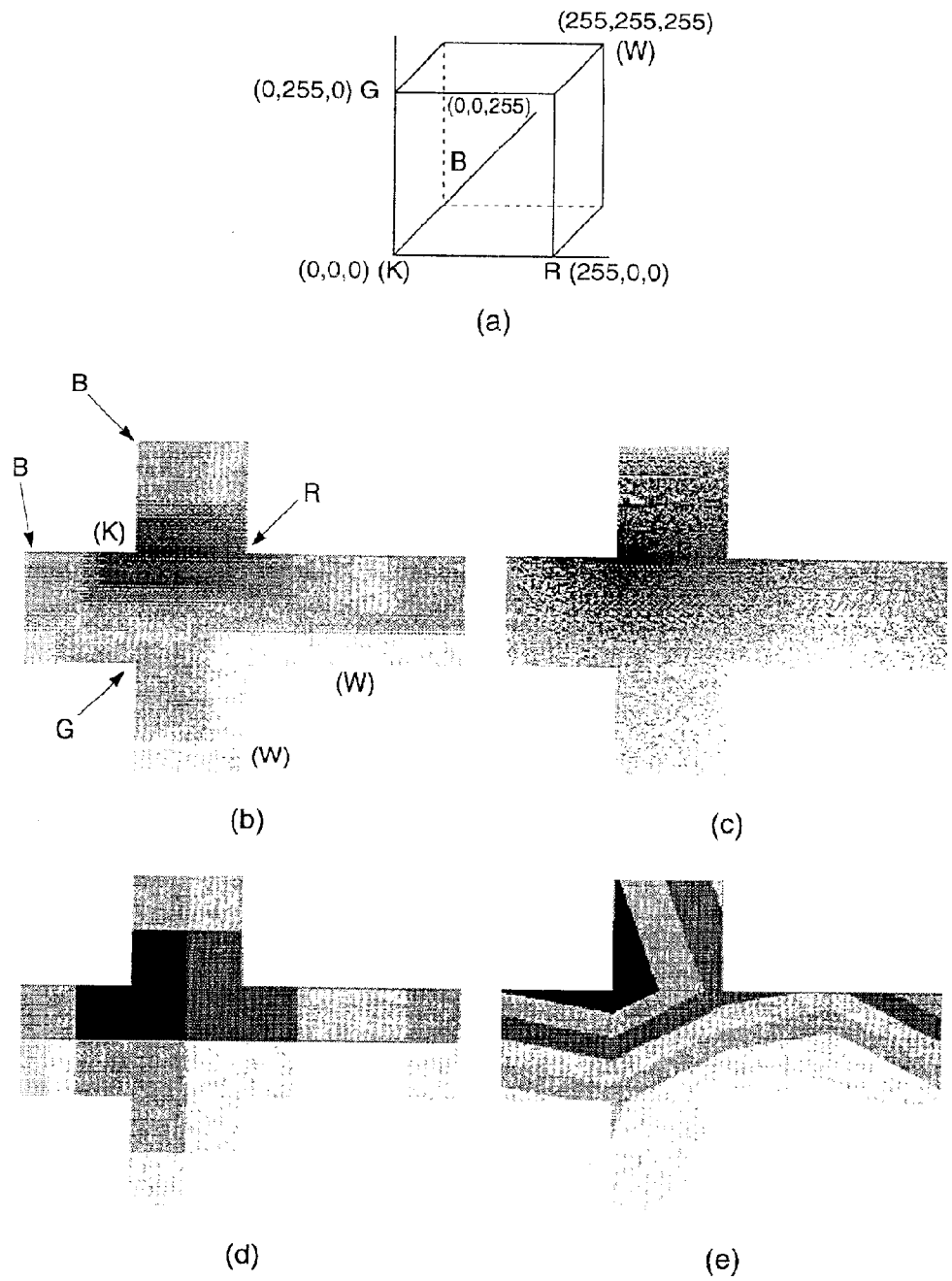
FIG. 14 shows various level conversion processes, where

FIG. 14 shows various color conversion processes referenced to an RGB gradation cube (source data). The RGB gradation cube shown in FIG. 14(a) is defined by a Cartesian coordinate system having axes red (R), green (G), and blue (B). Color intensity increases gradually along each axis starting from 0 at the origin (0,0,0) to a maximum of 255. In this RGB space black (K) results when each of the colors, red, green, and blue, is at its lowest level (0) and white results when each of the colors is at its highest level 255.

FIG. 14(b) to FIG. 14(e) show images of the cube unfolded on a plane, which are converted by some methods. Each image shown in FIG. 14(b) to FIG. 14(d) is obtained by reducing colors in the source data by applying a dither method (FIG. 14(b)), an error diffusion method (FIG. 14(c)), or a simple color reduction method (FIG. 14(d)) with black, red and white. The image shown in FIG. 14(e) is obtained by applying the method of this invention with black, red and white as printable colors. While the images are actually colored, they are presented in FIG. 14 as monochrome representations with appropriate shading to illustrate the effects.

Printing on a limited-color printer with three or less printable colors results in relatively monochrome images, and the tendency for small spots to appear in patterns in the print image is also evident in the drawings in FIG. 14.

As will be known from FIG. 14(b), color reduction by dithering produces fine granular points, which result in noise when assigned to only a few colors. In the image in FIG. 14(c), we can see color reduction by error diffusion also produces dispersed fine grains as noise.

The result of simple color reduction, shown in FIG. 14(d) shows a completely different pattern.

The image shown in FIG. 14(e), which results from the method of the present invention, shows a pattern of dividing luminance levels to eight levels. Using threshold values to convert the cube colors to gray scale levels before assigning colors results in eight patterns, and it will be noted that these patterns vary gradually in stages according to the change in luminance level.

Image Data Processing Gradations on a Plane

Figure 15:
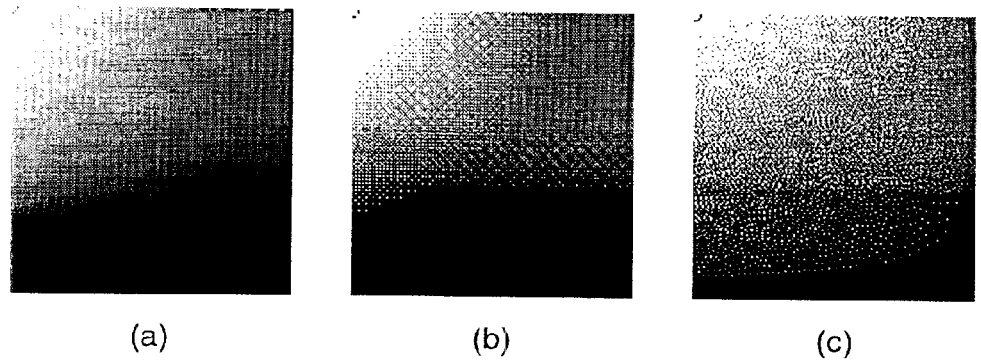
FIG. 15(a) shows a source data gradation image, in which black density increases downward as a gradient from the top left and red density increases as a gradient from top left to right.
FIG. 15(b) and FIG. 15(c) show this image after processing by dithering and error diffusion, respectively.
FIGS. 15(d) to FIG. 15(f) show this image after processing with the method of the present invention, where each of the images was printed using two colors, black and red.
Figure 15:
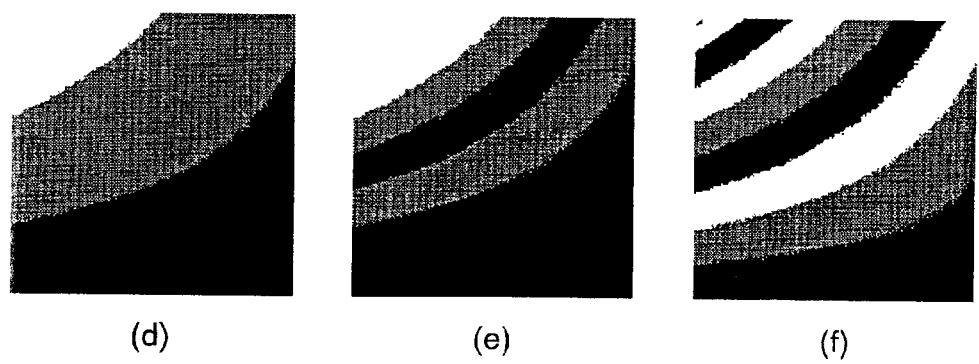

FIG. 15 shows the results of image data processing a color gradation image. As noted with regard to FIG. 14, the color images are shown as monochrome images to illustrate the effects. FIG. 15(a) shows source data that represents a gradation image in which black intensity increases gradually from top left down and red intensity increases from top left to right. The result of processing this image by dithering is shown in FIG. 15(b), error diffusion in FIG. 15(c), and the method of this invention in FIGS. 15(d), (e), and (f). All of the images were processed for three printable colors, black, red and white. While patterns are slightly different in the dithered and error diffusion images (b) and (c), they both contain a dispersed pattern of dots. Image (d) resulting from the present invention expresses both the change in luminance and the change in color brightness. While image (d) is also a digital representation, it is a well-defined image free of noise that directly reflects the change in gradation. Image (e) was achieved using the method of the invention to intentionally insert low luminance colors at intermediate luminance levels as a result of color assignment input by the user. Image (f) shows a different pattern resulting from the method of the invention applying a different set of color assignments intentionally input by the user. As will be seen from these images, the method of the invention creates images in which luminance gradations are digitally clearly defined.

Exemplary Control Screen

Figure 16:
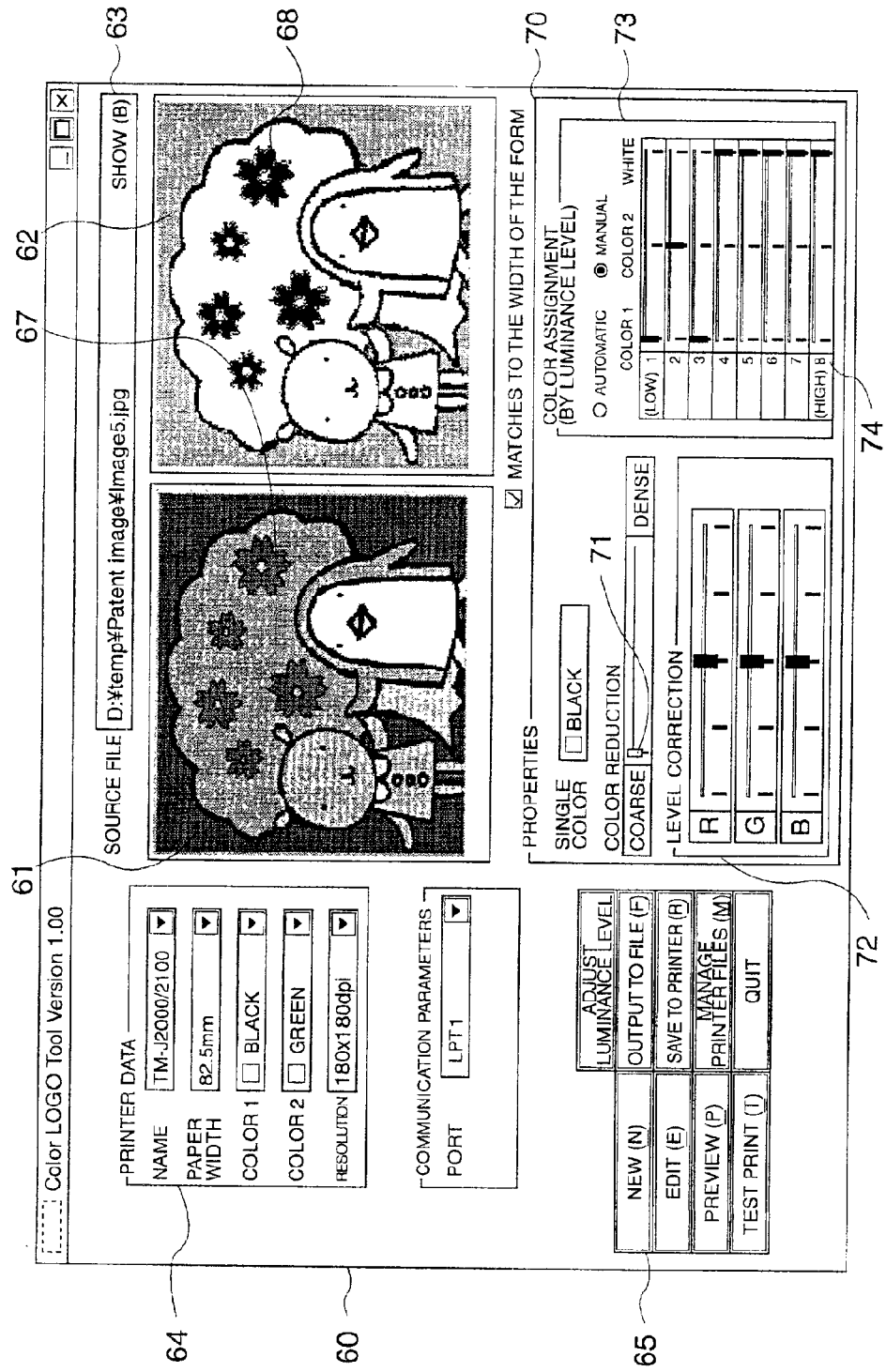
FIG. 16 shows an exemplary processing screen in an image data processing system according to the present invention.

FIG. 16 shows an example of a control screen for a system according to a preferred embodiment of the present invention. As noted with regard to FIG. 14 and FIG. 15 above, FIG. 16 also shows images on the screen in color as monochrome images.

An image 61 of the source data is presented in the top center of the screen. The print image 62 resulting from processing the source image 61 is shown to the right. The user can click on the source file button 63 shown at the top right to select FIG. 15 above, FIG. 16 also shows images on the screen in color as monochrome images.

An image 61 of the source data is presented in the top center of the screen. The print image 62 resulting from processing the source image 61 is shown to the right. The user can click on the source file button 63 shown at the top right to select the source file from which the source data for the source image 61 is read. The source data capturing unit 11 (FIG. 1) then reads the source data from the selected file. The display controller 14 (FIG. 1) then controls the display of the source data as source image 61 shown in FIG. 16 as described above.

A print parameter input box 64 is provided at the top left of the screen 60. This input box 64 is used to specify particular printer parameters, including the model of printer used for printing, paper width, print colors used, and printer resolution.

At the bottom left of the screen is a control box 65 with various controls for controlling the basic print data creation process and managing the print data files. More specifically, the control box 65 contains basic control buttons for generating and editing the print data, outputting finished or in progress print data, saving print data in the printer, and other buttons for manipulating the print data files. The control box 65 thus provides controls for handling essential operations from creating to saving the print data files.

A properties box 70 is located at the bottom center of the screen 60. The basic functions accessible through this properties box 70 include the color reduction function, level correction, and color assignment. The color reduction process is controlled in this properties box 70 using a slider 71 for setting the color reduction to one of three levels varying from coarse (low resolution) to fine (high resolution) control. In this example setting the slider 71 to the "coarse" position applies color reduction according to the present invention, moving the slider to the middle position selects dithering, and the "fine" position selects error diffusion. The level correction box 72 is used to separately correct each of the RGB luminance levels to one of four settings. The color assignment box 73 enables the user to select either an automatic or manual mode. If the manual mode is selected, for each of the luminance levels 74 to which the source image has been reduced (8 here), the user can assign one of three colors (first color, second color, and white (non-printing color)) to all pixels at that luminance level.

In the exemplary screen 60 shown in FIG. 16, the manual mode is selected, the first color is assigned to pixels in luminance levels 1 and 3, and the second color is assigned to pixels in luminance level 2. This enables the luminance difference of the petals 67 in the cherry blossoms, which are substantially indistinguishable in the source image 61, to be displayed with different colors so that petals can be displayed as a clearly distinguishable pattern as indicated by the flower petals 68 in the print image 62.

Figure 17:
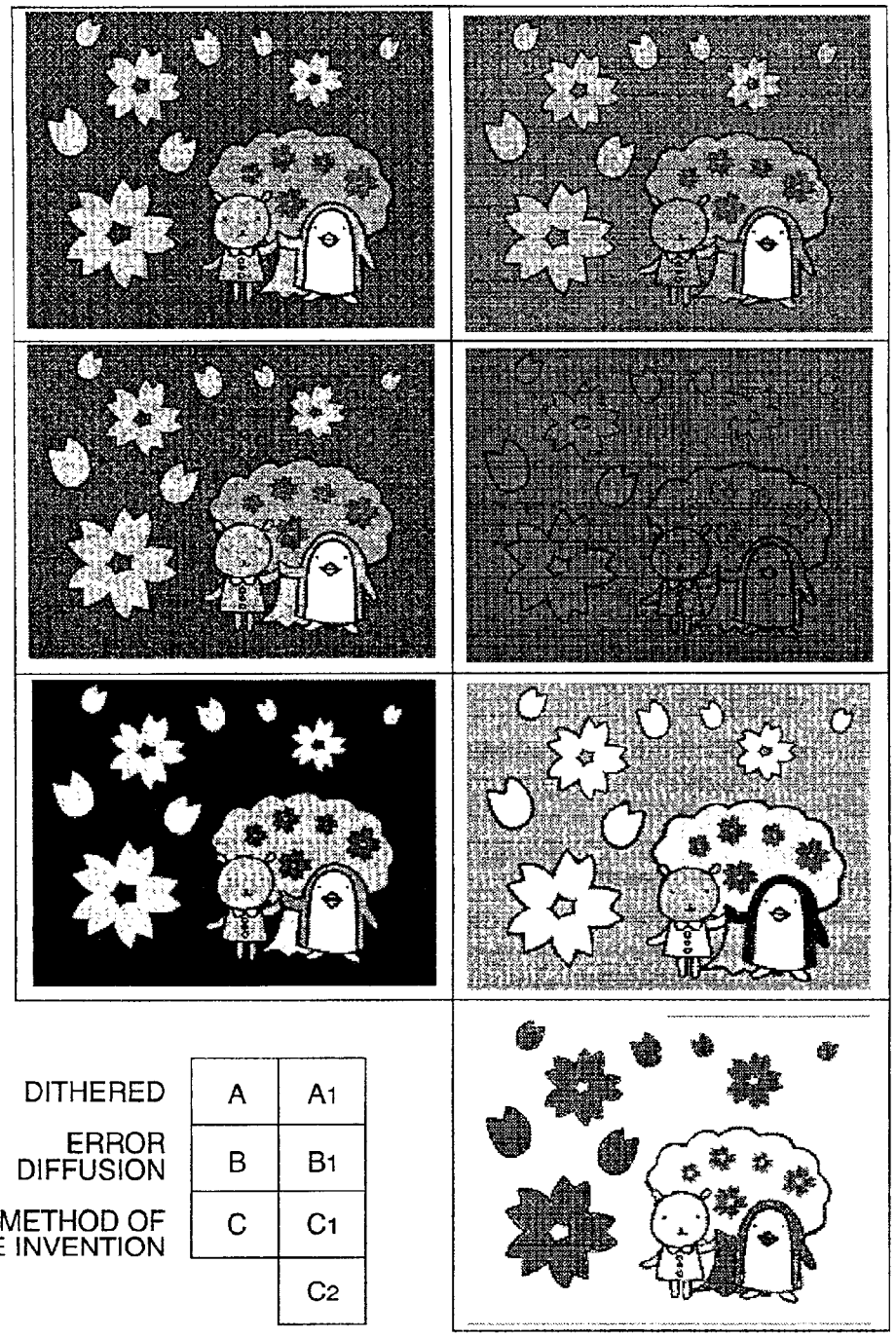
FIG. 17 shows various images illustrating the difference between processing by means of the present invention, dithering, and error diffusion.

FIG. 17 shows images resulting from image data processing by the present invention, dithering, and error diffusion processes with black, red and white as printable colors. FIG. 17 also shows these color images as monochrome images due to filing requirements. The actual color images are obviously slightly different in appearance, but the differences in the images resulting from the various image processing operations can be recognized from the figures. FIG. 17(a) shows the numbers assigned and image processing operations applied to the figures shown in (b), and (b) shows the images before and after image data processing. The images in (b) were all derived from the same original color image, which had a deep, brilliant blue background and cherry blossoms in various light and dark shades of pink. Multiple relatively pale colors were used for the other characters and figures.

The images shown in (b) are further described below. Images A and A1 in the top row were dithered. Image A was reduced to 8 colors by dithering the original color image. Image A1 is the print image resulting from assigning red, black, and white (non-printing color) to pixels in image A based on the color component (RGB value) of each pixel. Red, for example, is assigned to pixels where the color intensity value (R,G,B)=(1,0,0). Note the dot pattern appearing in the background of the print image A1.

Image B is the result of using error diffusion to reduce the original color image to 8 colors. The same process used to convert image A to image A1 was applied to obtain image B1 by assigning red, black and white to the pixels in image B based on the color value (RGB value) of each pixel. Note the pattern of spots that also appears in the background of print image B1.

Image C is the result of image data processing using the method of the present invention, converting the original color image to a monochrome halftone image containing 8 luminance levels. Red, black and white were then assigned to the pixels based on the luminance level of the respective pixel, and the result was printed as image C1. Note that with the method of this invention there are no spots in the background, which is printed an even red (which appears as a dark gray in the figure due to the brightness of the red). Image C2 was also obtained by assigning red, black, and white to image C, but in this case the image was manipulated to obtain a clearer print image by, for example, assigning red to all pixels in the cherry blossom petals that have the same luminance level, and assigning white to all pixels in the blue background that have the same luminance level. It will thus be understood that a well defined two- or three-color print image can be created based on the luminance values of the original image by using the method of this invention.

Color Expression Achieved with Halftone

If there are three material colors, that is, two colors of ink and white (the non-printing color of the paper), and each pixel is represented by a 2×2 matrix of four dots (dither units), fifteen colors (dithered tones) can be expressed with each matrix of four dots. This means that each pixel can express one of fifteen colors (printable colors). Yet more specifically, by controlling the area of each color in a particular pixel, each pixel can express one of fifteen tones. Note that this ignores the position of each color in the pixel, and considers only the area ratio of the colors.

Figure 18:
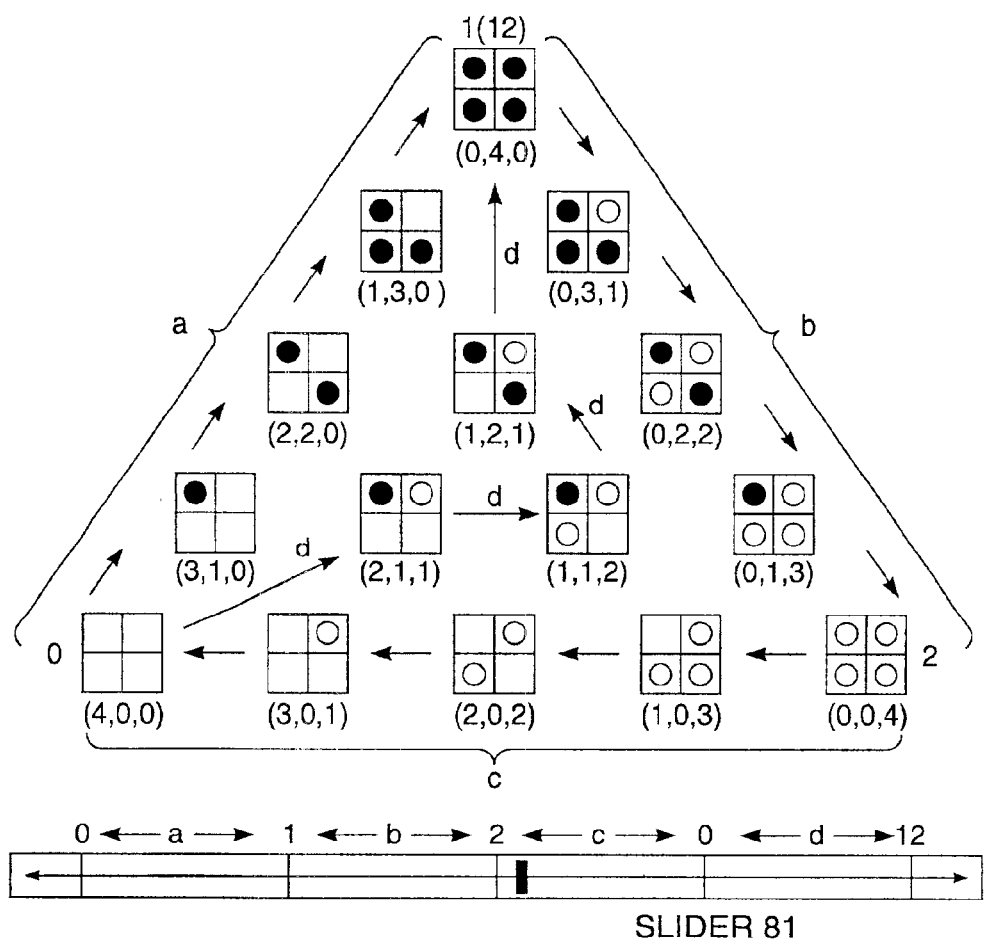
FIG. 18(a) shows the relationship between the color assignment slider shown in FIG. 12 and fifteen colors that can be expressed by a printer that can printer two colors (three colors including a non-printing color) per dot, where each pixel consists of four dots.
FIG. 18(b) shows a sample dialog box for assigning eight luminance levels to fifteen printable colors.
Figure 18:
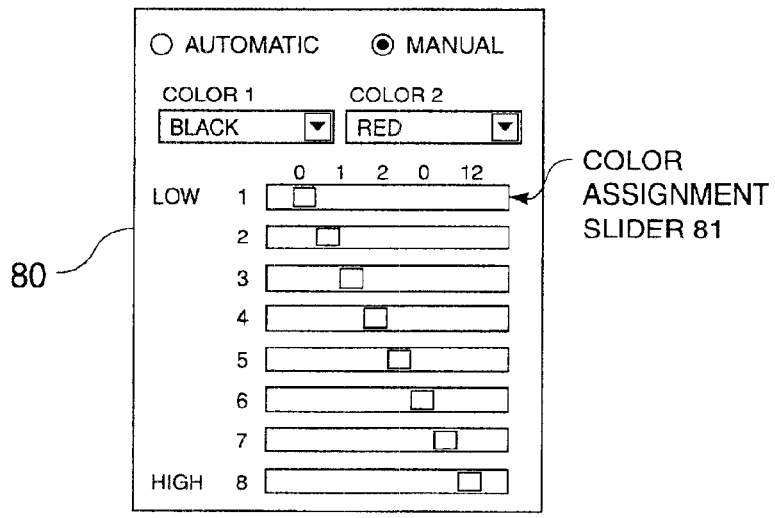

How fifteen printable colors can be expressed, and how the luminance levels in an image containing 8 luminance levels are assigned to these fifteen printable colors, are described next with reference to FIG. 18. FIG. 18(a) shows the relationship between the 15 tones (colors) that can be expressed with four dots per pixel, and the color assignment sliders 81 in the color assignment box 73 shown in FIG. 18(b) using a printer capable of printing two colors (three material colors including the non-printing color). FIG. 18(b) shows a color assignment box 80 for assigning 8 luminance levels to fifteen colors. In FIG. 18 a black dot (•) denotes black, a circle (○) denotes red, and a blank denotes a white dot. The three values in parenthesis below each matrix show the number of (white, black, red) dots in the matrix (pixel). In other words, the shade of each pixel is determined by the ratio of dots (area) of each color in the four dots constituting the pixel.

Region a (0→1) in FIG. 18 shows the matrixes containing only white and black dots, ranging from a matrix with four white dots (0) to a matrix with four black dots (1). Region b (1→2) shows the matrixes containing only black and red dots, ranging from four black dots to four red dots (2). Region c (2→0) shows matrixes containing only red and white dots, ranging from four red dots to four white dots. Area d (0→12) shows the matrixes variously combining white, red, and black dots, and includes the transition from four white to four black dots.

The relationship between the color assignment determined by the position of the slider 81 in FIG. 18 and pixel dot configuration will be understood from the figures. That is, pixels of a certain luminance level change gradually from white to black as the color assignment slider 81 moves from 0 to 1, from black to red as the slider moves from 1 to 2, from red to white as the slider moves from 2 to 0, and from white through a mixture of white, red, and black to black as the slider moves from 0 to 12.

The color assignment sliders 81 provided for each luminance level 1 to 8 in the color assignment box 80 in FIG. 18(b) are used to assign any one of the fifteen printable colors to each luminance level. FIG. 18(b) shows an example of a color assignment box for two printable colors where the first color is black and the second color is red. In this color assignment box 80 each slider 81 is moved along the scale from 0→1→2→0→12 for each of the eight luminance levels 1 to 8 to assign a particular color to that luminance level. FIG. 18(b) shows an example in which sliders 81 are used to assign any of fifteen colors to eight luminance levels, but it will be apparent that if a full color image (or a 256 level gray scale image) is reduced to fifteen luminance levels instead of eight, each of these fifteen levels can be similarly assigned to one of fifteen colors.

As described above, constant, fixed color assignments can result in important luminance level borders being assigned to the same color, creating an image in which important image elements are difficult to discern. However, by enabling the user to freely assign the printable colors according to image luminance levels and easily change the color assignments, a clear, expressive print image can be created.

Furthermore, by increasing the number of assignable colors using dithering or shot gradation using a method of changing a number of ejected droplets for a pixel in an inkjet printer, and enabling the user to freely assign the printable colors, printer output can be made more expressive even when a printer, such as a two-color printer, that can only print a limited number of colors is used.

Alternative Embodiment

A method for converting full-color source data (such as a color image with a color intensity of 256 levels for each of RGB) first to a high resolution gray scale image (containing 256 luminance levels), then converting this high resolution gray scale image to a low resolution image (having 8 luminance levels), and then assigning one of the printable colors to each pixel according to the luminance level (1 to 8) of the pixel is described as a first embodiment of the invention for generating print data. However, the method of the invention can be modified as described below.

First, the colors of a full-color source image are reduced using a simple color reduction technique. If the source data is a full-color image with a 256 level color intensity for each of RGB, for example, it is reduced to an 8-color image. This reduced image is then converted to a gray scale image by applying equation (1) to obtain low resolution (8 level) luminance data. Print colors are then assigned to each pixel according to the luminance level (1 to 8) of the pixel as described above. In other words, instead of reducing the number of luminance levels after converting the colors of the source data to gray scale levels in order to obtain the low resolution luminance data used for color assignment, this alternative embodiment first applies a color reduction process to the source data and then converts the resulting image to a gray scale image.

The embodiment described above assumes a logo tool for generating logo data saved in a POS printer or similar printer. However, the basic technical concept of the invention, that is, assigning a color to each pixel according to its luminance level by converting a color image to a gray scale image, is not limited to such a logo tool but rather can be used in other applications as well. The invention can, for example, be used in a printer driver for printing color bitmap images on a printer that can only print a limited number of colors (such as two) as part of a device control system provided by OLE for Retail POS (referred to as "OPOS" below) for the Windows® operating system. More specifically, applications such as these conventionally require use of a separate bitmap conversion tool to convert a full-color image to a 2-color image for printing. Using the present invention, however, these files can be printed without this file conversion step. Furthermore, images resulting from image data processing by the invention are not limited to output on a printer, and can be output on a display device.

Figure 19:
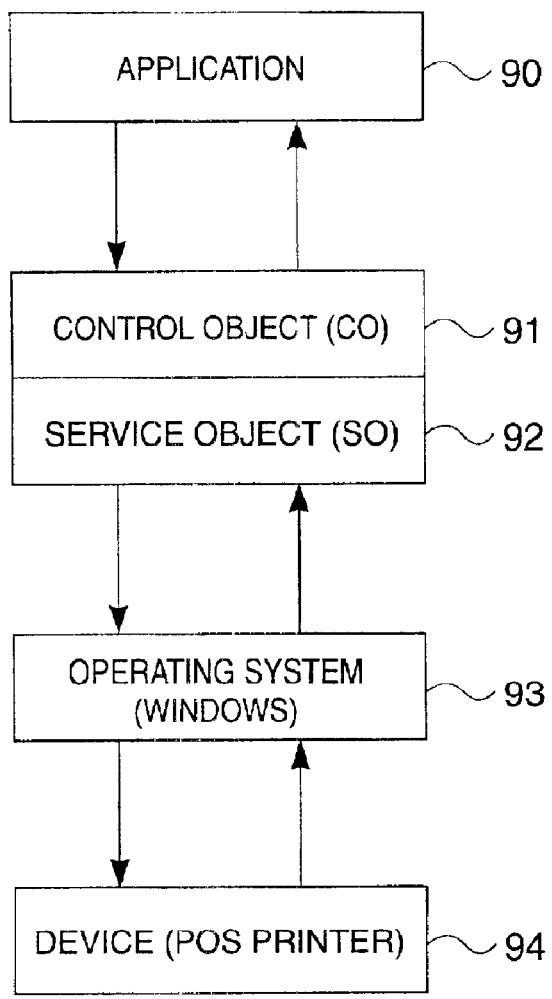
FIG. 19 shows the basic configuration of an OPOS system.

Using the invention in an OPOS system is described next below with reference to FIG. 19 and FIG. 20 to show how the system and method according to the invention can be implemented using a personal computer. FIG. 19 shows the basic concept of OPOS. Device 94 can be a printer or customer display, and is described below as a printer.

OPOS provides a device-independent interface for printers and other peripherals for POS application programs based on standardized specifications running under Windows®. For the POS application 90 to output from printer 94, it first passes the data to the printer control object (CO) 91. The control object 91 then passes the data to the service object (SO) 92 for the model of the output printer, and the operating system (OS) 93 then passes the data to the printer 94. If the printer 94 is a two or three color printer, multicolored images must be reduced to the printable colors for printing.

With the device control system provided by OPOS the service object 92 primarily runs a specific process for a particular device 94. The luminance conversion function, luminance level reduction function, and color assignment function of the present invention can therefore be built into the service object 92 so that the source data is converted to print data that can be printed by the printer 94 and is then sent through the OS 93 to the printer 94 for printing.

In other words, if full-color image data is sent, as source data, from the POS application 90 to the device control system provided by OPOS, the service object 92 determines the luminance level of each pixel in the source data, and assigns a particular color to each pixel according to the pixel's luminance level as described above, thereby creating 2-color or 3-color print data for printing by the POS printer. The service object 92 then sends this print image data through the OS 93 to the printer 94. The process for converting full-color image data to print data for printing with a limited number of colors can therefore be built into the service object 92. By writing the service object 92 to perform this image conversion function, individual application programs do not need to run a process for converting full-color image data to 2-color or 3-color print data for printing by the printer 94, and application development is thus made easier.

Figure 20:
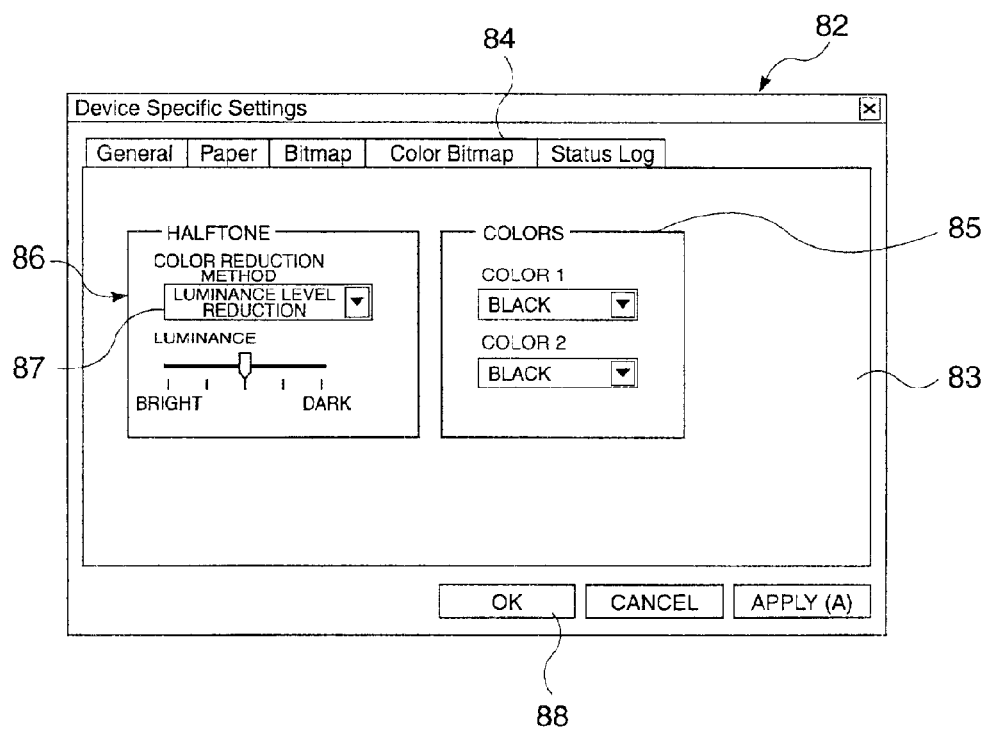
FIG. 20 shows an exemplary dialog box displayed on a personal computer or the like for setting image data processing parameters.

A dialog box for controlling this image data conversion process is shown in FIG. 20. The service object 92 is written to include a service routine that includes reducing color from a full color image and can display a dialog box 82 such as shown in FIG. 20. The content displayed in display area 83 changes according to the selected control button. If the color bitmap tab 84 is selected, for example, a color selector 85 and color reduction method selector 86 such as shown in FIG. 20 are displayed in the display area 83. In this example the arrow shown on the right side of the first and second color selectors can be clicked to select a particular color. The example shown in FIG. 20 anticipates a 2-color printer and enables selecting only two colors, but it will be understood that selecting three or more colors could is also possible.

Dithering or another color reduction method can be selected at the color reduction method selection box 87 of the color reduction method selector 86. If luminance reduction is selected by the color reduction method selection box 87 and the OK button 88 is then clicked, a properties box 70 such as shown in FIG. 16 is displayed in the display area 83, for example, so that the user can adjust the process as described above. Note that the source data image 61 and print image 62 after the color reduction and color assignment processes can also be displayed as shown in FIG. 16.

The present invention can generate print data based on the luminance levels of the source data image by converting the color of each pixel in a source data file containing multicolored image data, for example, to a luminance value, and then assigning a particular printable color to each pixel based on the luminance level of the pixel. This method generates print data enabling the original image to be printed accurately, clearly and without spots or noise in the print image even when it is printed with a limited number of colors.

In addition to dithering and other color reduction methods, this invention can also assign colors based on the luminance level and apply other image data processing operations to print multicolored source images using only a few colors, and thereby provides a system and method capable of applying numerous image processes.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A system for processing image data for display or printout by an output device, comprising:
    a source data capturing unit for obtaining source data containing a representation in plural colors of an image, a graphic or text;

a data converter for converting color data for each pixel in the source data to luminance data for that pixel, the luminance data representing one of a plurality of luminance levels; and a color assignment unit for assigning one of a plurality of colors that are available in the output device to each pixel according to a luminance level represented by the luminance data of that pixel but without consideration of chrominance characteristics of that pixel.

2. The system of claim 1, wherein the color data of each pixel is represented by color intensity values of primary colors, and the data converter is adapted to convert the color data to the luminance data by weighting each color intensity value by a weighting factor assigned to that color intensity value, and summing the weighted color intensity values.

3. The system of claim 2, wherein the primary colors are red, green, and blue, and the ratio of the weighting factors is equal, or approximately equal, to R:G:B=3:6:1 where R represents red, G represents green and B represents blue.

4. The system of claim 1, wherein the data converter comprises a luminance calculator for converting the color data for each pixel to first luminance data representing one of a first number of luminance levels, and a gray level processor for further converting the first luminance data for each pixel to second luminance data representing one of the plurality of luminance levels, the plurality being a second number smaller than the first number.

5. The system of claim 4, wherein the gray level processor comprises:

a distribution calculator for calculating a luminance distribution by counting for each luminance level of the first number the number of pixels whose corresponding luminance data represents that luminance level, and for detecting one or more luminance levels that represent local pixel count minimums in the luminance distribution; and threshold value selecting means for setting threshold values based on the one or more minimums;

wherein the gray level processor is adapted to reduce the first number of luminance levels to the second number based on the threshold values.

6. The system of claim 5, wherein the distribution calculator is adapted to smooth the luminance distribution, and to detect the one or more minimums from the smoothed luminance distribution.

7. The system of claim 5, wherein the distribution calculator is adapted to detect the one or more minimums by scanning the luminance distribution from one of the smallest and the highest luminance level to the other one of these two luminance levels and finding one or more luminance levels at which the pixel count value starts increasing and keeps increasing for a predetermined plurality of consecutive luminance levels, after it had decreased for a predetermined plurality of consecutive luminance levels.

8. The system of claim 1, wherein the plurality of luminance levels is eight.

9. The system of claim 1, wherein the plurality of luminance levels is N, and the color assignment unit is adapted to assign to each of the N luminance levels a respective one of N available colors.

10. The system of claim 1, wherein the color assignment unit comprises color assignment selection means responsive to user input for specifying or changing the assignment of an available color to each pixel based on the luminance level represented by the luminance data of that pixel.

11. The system of claim 1, wherein the output device is a printer for printing on a printing medium, and the plurality of available colors are printable colors defined by material colors provided for printing in the printer, the material colors including colors of ink or heat sensitive colorants, and the color of the printing medium itself.

12. The system of claim 11, wherein the printable colors include halftones that can be created by combining the material colors.

13. A method of processing image data for display or printout by an output device, comprising steps of:

(a) obtaining and storing source data containing a representation in plural colors of an image, a graphic or text;

(b) converting color data of each pixel in the source data to luminance data for that pixel, the luminance data representing one of a plurality of luminance levels; and (c) assigning one of plurality of colors that are available in the output device to each pixel according to the luminance level represented by the luminance data of that pixel but without consideration of chrominance characteristics of that pixel.

14. The method of claim 13, wherein the color data of each pixel is represented by intensity values of primary colors, and step (b) comprises converting the color data to the luminance data by weighting each color intensity value by a weighting factor assigned to that color intensity value, and summing the weighted color intensity values.

15. The method of claim 14, wherein the primary colors are red, green, and blue, and the ratio of the weighting factors is equal or approximately equal to R:G:B=3:6:1 where R represents red, G represents green and B represents blue.

16. The method of claim 13, wherein step (b) comprises:

(b)(1) converting the color data for each pixel to first luminance data representing one of a first number of luminance levels, and (b)(2) further converting the first luminance data for each pixel to second luminance data representing one of the plurality of luminance levels, the plurality being a second number smaller than the first number.

17. The method of claim 16, wherein step (b)(2) further comprises:

(b)(2)(i) calculating a luminance distribution by counting for each luminance level of the first number the number of pixels whose corresponding luminance data represents that luminance level;

(b)(2)(ii) detecting one or more luminance levels that represent local pixel count minimums in the luminance distribution; (b)(2)(iii) setting threshold values based on the one or more minimums; and (b)(2)(iv) reducing the first number of luminance levels to the second number based on the threshold values.

18. The method of claim 17, wherein step (b)(2)(ii) detects the one or more minimums by scanning the luminance distribution from one of the smallest and the highest luminance level to the other one of these two luminance levels and finding one or more luminance levels at which the pixel count value starts increasing and keeps increasing for a predetermined plurality of consecutive luminance levels, after it had decreased for a predetermined plurality of consecutive luminance levels.

19. The method of claim 17, wherein step (b)(2) further comprises:

(b)(2)(v) smoothing the luminance distribution, and step (b)(2)(ii) comprises detecting the one or more minimums from the smoothed luminance distribution.

20. The method of claim 13, wherein the plurality of luminance levels is eight.

21. The method of claim 13, wherein the plurality of luminance levels is N, and step (c) comprises assigning to each of the N luminance levels a respective one of N available colors.

22. The method of claim 13, wherein step (c) comprises responding to user input by specifying or changing the assignment of an available color to each pixel based on the luminance level represented by the luminance data of the pixel.

23. The method of claim 13, applied to processing image data for printout on a printing medium by a printer, wherein the plurality of available colors are printable colors defined by material colors provided for printing in the printer, the material colors including colors of ink or heat sensitive colorants, and the color of the printing medium itself.

24. The method of claim 23, wherein the printable colors include halftones that can be created by combining the material colors.

25. A machine-readable medium carrying a program of instructions executable by the machine to perform a method of processing image data for display or printout by an output device, the program of instructions comprising:
   (a) instructions for obtaining and storing source data containing a representation in plural colors of an image, a graphic or text;
   (b) instructions for converting color data of each pixel in the source data to luminance data for that pixel, the luminance data representing one of a plurality of luminance levels; and
   (c) instructions for assigning one of plurality of colors that are available in the output device to each pixel according to the luminance level represented by the luminance data of that pixel but without consideration of chrominance characteristics of that pixel.

26. The machine-readable medium of claim 25, wherein the color data of each pixel is represented by intensity values of primary colors, and instructions (b) comprise instructions for converting the color data to the luminance data by weighting each color intensity value by a weighting factor assigned to that color intensity value, and summing the weighted color intensity values.

27. The machine-readable medium of claim 26, wherein the primary colors are red, green, and blue, and the ratio of the weighting factors is equal or approximately equal to R:G:B=3:6:1 where R represents red, G represents green and B represents blue.

28. The machine-readable medium of claim 25, wherein instructions (b) comprise:
   (b)(1) instructions for converting the color data for each pixel to first luminance data representing one of a first number of luminance levels, and
   (b)(2) instructions for further converting the first luminance data for each pixel to second luminance data representing one of the plurality of luminance levels, the plurality being a second number smaller than the first number.

29. The machine-readable medium of claim 28, wherein instructions (b)(2) further comprise:
   (b)(2)(i) instructions for calculating a luminance distribution by counting for each luminance level of the first number the number of pixels whose corresponding luminance data represents that luminance level;
   (b)(2)(ii) instructions for detecting one or more luminance levels that represent local pixel count minimums in the luminance distribution;
   (b)(2)(iii) instructions for setting threshold values based on the one or more minimums; and
   (b)(2)(iv) instructions for reducing the first number of luminance levels to the second number based on the threshold values.

30. The machine-readable medium of claim 29, wherein instructions (b)(2)(ii) comprises instructions for detecting the one or more minimums by scanning the luminance distribution from one of the smallest and the highest luminance level to the other one of these two luminance levels and finding one or more luminance levels at which the pixel count value starts increasing and keeps increasing for a predetermined plurality of consecutive luminance levels, after it had decreased for a predetermined plurality of consecutive luminance levels.

31. The machine-readable medium of claim 29, wherein instructions (b)(2) further comprise:
   (b)(2)(v) instructions for smoothing the luminance distribution, and
   instructions (b)(2)(ii) comprise instructions for detecting the one or more minimums from the smoothed luminance distribution.

32. The machine-readable medium of claim 25, wherein the plurality of luminance levels is eight.

33. The machine-readable medium of claim 25, wherein the plurality of luminance levels is N, and instructions (c) comprise instructions for assigning to each of the N luminance levels a respective one of N available colors.

34. The machine-readable medium of claim 25, wherein instructions (c) comprise instructions for responding to user input by specifying or changing the assignment of an available color to each pixel based on the luminance level represented by the luminance data of the pixel.

35. The machine-readable medium of claim 25, applied to processing image data for printout on a printing medium by a printer, wherein the plurality of available colors are printable colors defined by material colors provided for printing in the printer, the material colors including colors of ink or heat sensitive colorants, and the color of the printing medium-itself.

36. The machine-readable medium of claim 35, wherein the printable colors include halftones that can be created by combining the material colors.

37. A system for processing image data for display or printout by an output device, comprising:
   a source data capturing unit for obtaining source data containing a representation of an image, a graphic or text in plural colors;
   a data converter for converting color data for each pixel in the source data to luminance data for the respective pixel, the luminance data representing one of a plurality of luminance levels; and
   a color assignment unit for assigning one of N printable colors that are available in the output device to each pixel according to a luminance level represented by the luminance data of that pixel, so as to obtain processed data representing a multicolor image, wherein $N \geq 2$.

38. A method of processing image data for display or printout by an output device, comprising steps of:
   (a) obtaining and storing source data containing a representation of an image, a graphic or text in plural colors;
   (b) converting color data of each pixel in the source data to luminance data for the respective pixel, the luminance data representing one of a plurality of luminance levels; and (c) assigning one of N printable colors that are available in the output device to each pixel according to the luminance level represented by the luminance data of that pixel, so as to obtain processed data representing a multicolor image, wherein $N \geqq 2$.

39. A machine-readable medium carrying a program of instructions executable by the machine to perform a method of processing image data for display or printout by an output device, the program of instructions comprising:

(a) instructions for obtaining and storing source data containing a representation of an image, a graphic or text in plural colors;

(b) instructions for converting color data of each pixel in the source data to luminance data for the respective pixel, the luminance data representing one of a plurality of luminance levels; and (c) instructions for assigning one of N printable colors that are available in the output device to each pixel according to the luminance level represented by the luminance data of that pixel, so as to obtain processed data representing a multicolor image, wherein $N \geqq 2$.

* * * * *